US008797990B2

(12) United States Patent
Kishiyama et al.

(10) Patent No.: US 8,797,990 B2
(45) Date of Patent: Aug. 5, 2014

(54) REFERENCE SIGNAL TRANSMISSION METHOD, MOBILE STATION APPARATUS AND BASE STATION APPARATUS

(75) Inventors: Yoshihisa Kishiyama, Tokyo (JP); Teruo Kawamura, Tokyo (JP); Daisuke Nishikawa, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 174 days.

(21) Appl. No.: 13/578,885

(22) PCT Filed: Feb. 15, 2011

(86) PCT No.: PCT/JP2011/053079
§ 371 (c)(1),
(2), (4) Date: Oct. 15, 2012

(87) PCT Pub. No.: WO2011/099613
PCT Pub. Date: Aug. 18, 2011

(65) Prior Publication Data
US 2013/0039305 A1    Feb. 14, 2013

(30) Foreign Application Priority Data

Feb. 15, 2010  (JP) ................................ 2010-030372
Apr. 5, 2010   (JP) ................................ 2010-087380
Apr. 30, 2010  (JP) ................................ 2010-105940
Jun. 21, 2010  (JP) ................................ 2010-141019

(51) Int. Cl.
*H04W 4/00*    (2009.01)
(52) U.S. Cl.
USPC ........................................................ 370/329
(58) Field of Classification Search
USPC .................................................. 370/328–339
See application file for complete search history.

(56) References Cited

U.S. PATENT DOCUMENTS

| 2010/0254276 A1 | 10/2010 | Nishikawa et al. | |
| 2011/0268087 A1* | 11/2011 | Kwon et al. | 370/331 |
| 2012/0263129 A1* | 10/2012 | Noh et al. | 370/329 |
| 2013/0208690 A1* | 8/2013 | Nishikawa et al. | 370/329 |

FOREIGN PATENT DOCUMENTS

| JP | 2009-147638 A | 7/2009 |
| JP | 2010-034612 A | 2/2010 |

OTHER PUBLICATIONS

Texas Instruments, "Increasing Sounding Capacity for LTE-A," 3GPP TSG RAN WG1 #59bis, R1-100459, Jan. 18-22, 2010 (4 pages).
Nokia Siemens Networks, et al., "Channel sounding enhancements for LTE-Advanced," 3GPP TSG RAN WG1 Meeting #59bis, R1-100337, Jan. 18-22, 2010 (3 pages).
Catt, "SRS enhancements for LTE-A UL transmission," 3GPP TSG RAN WG1 Meeting #59bis, R1-100075, Jan. 18-22, 2010 (6 pages).
Bibliographic data for JP2010034612(A), dated Feb. 12, 2010, downloaded from Espacenet (2 pages).
NTT Docomo, "Views on SRS Enhancement for LTE-Advanced," 3GPP TSG RAN WG1 Meeting #60, R1-101224, Feb. 22-26, 2010 (8 pages).

(Continued)

Primary Examiner — Frank Duong
(74) Attorney, Agent, or Firm — Osha Liang LLP

(57) ABSTRACT

To efficiently use radio resources used in transmission of SRS, a base station apparatus (eNode B) transmits a scheduling grant including an instruction for transmission of a Sounding Reference Signal (SRS), and a mobile station apparatus (UE) transmits the SRS in response to the scheduling grant. The SRS is transmitted in the same subframe, another subframe or a previous subframe by the predetermined number of subframes as, immediately before, or before a subframe of a PUSCH (Physical Uplink Shared Channel) that the scheduling grant instructs to transmit.

11 Claims, 20 Drawing Sheets

(56) References Cited

OTHER PUBLICATIONS

3GPP TR 25.912 V7.1.0, "3rd Generation Partnership Project; Technical Specification Group Radio Access Network; Feasibility study for evolved Universal Terrestrial Radio Access (UTRA) and Universal Terrestrial Radio Access Network (UTRAN) Release (7)," Sep. 2006 (57 pages).
Translation of International Search Report issued in PCT/JP2011/053079, mailed on Mar. 15, 2011 (5 pages).
Notification of Reasons for Rejection w/translation issued for Japanese Application No. 2012-244553, dated Jan. 22, 2013, (5 pages).
Notification of Reasons for Rejection w/translation issued for Japanese Patent Application No. 2010-141019, dated Jul. 24, 2012, (4 pages).
3GPP TSG RAN WG1 Meeting #59, R1-095001; "36.212 Editorial CR cover page", Qualcomm Europe; Jeju, South Korea; dated Nov. 9-13, 2009, (60 pages).
3GPP TSG RAN WG1 Meeting #59bis, R1-100133; "Configuring SRS Transmissions in Rel. 10", Samsung; Valencia, Spain; dated Jan. 19-23, 2010, (3 pages).
Decision to Grant a Patent in corresponding Japanese application No. 2012-244553 dated Apr. 9, 2013 (4 pages).

\* cited by examiner

FIG. 20A

| TPC | $\delta_{PUSCH}$[dB] |
|---|---|
| 0 | −1 |
| 1 | 0 |
| 2 | 1 |
| 3 | 3 |

FIG. 20B

| Extended TPC | $\delta_{PUSCH}$[dB] |
|---|---|
| 0 | −7 |
| 1 | −6 |
| 2 | −5 |
| 3 | −4 |
| 4 | −3 |
| 5 | −2 |
| 6 | −1 |
| 7 | 0 |
| 8 | 1 |
| 9 | 2 |
| 10 | 3 |
| 11 | 4 |
| 12 | 5 |
| 13 | 6 |
| 14 | 7 |
| 15 | 8 |

REFERENCE SIGNAL TRANSMISSION METHOD, MOBILE STATION APPARATUS AND BASE STATION APPARATUS

TECHNICAL FIELD

The present invention relates to a reference signal transmission method, mobile station apparatus and base station apparatus and more particularly, to a reference signal transmission method, mobile station apparatus and base station apparatus in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (for example, see Non-patent Document 1).

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in. LTE-A, it is scheduled to increase 20 MHz that is the maximum system band in LTE specifications to about 100 MHz.

In the LTE-scheme system (LTE system), a base station apparatus measures uplink channel quality based on an SRS (Sounding Reference Signal) for channel quality measurement transmitted from a mobile station apparatus, performs scheduling for the mobile station apparatus to transmit a data channel signal (PUSCH: Physical Uplink Shared Channel), and issues instructions on a PDCCH (Physical Downlink Control Channel). In this case, the SRS for channel quality measurement is multiplexed into a last symbol in some of subframes constituting a radio frame in uplink, and is transmitted periodically at intervals of 5 msec from the mobile station apparatus to the base station apparatus.

PRIOR ART LITERATURE

Non-Patent Literature

[Non-patent Literature 1] 3GPP, TR25.912 (V7.1.0), "Feasibility study for Evolved UTRA and UTRAN", September 2006

SUMMARY OF INVENTION

Technical Problem

However, in the LTE system, even when there is no data channel signal (PUSCH) transmitted from the mobile station apparatus in uplink, the SRS is transmitted periodically to the base station apparatus. Therefore, radio resources for use in transmission of SRS are fixedly used irrespective of the presence or absence of a data channel signal (PUSCH), and there is the problem that it is difficult to use radio resources efficiently.

The present invention is made in view of such a problem, and it is an object of the invention to provide a reference signal transmission method, mobile station apparatus and base station apparatus for enabling radio resources used in transmission of SRS to be used efficiently.

Solution to the Problem

A reference signal transmission method of the invention is characterized by having the steps of transmitting a scheduling grant including an instruction for transmission of a Sounding Reference Signal (SRS) from a base station apparatus, and transmitting the SRS from a mobile station apparatus in responses to the instruction for transmission of the SRS included in the scheduling grant.

A reference signal transmission method of the invention is characterized by having the steps of transmitting an uplink scheduling grant including an instruction for transmission of Sounding Reference Signal (SRS) from a base station apparatus, and transmitting the SRS from a mobile station apparatus, in response to the instruction for transmission of the SRS included in the uplink scheduling grant.

According to this method, since the mobile station apparatus transmits an SRS in response to the instruction for transmission of the SRS included in the uplink scheduling grant, it is possible to dynamically control a subframe into which the SRS is multiplexed, and it is thereby possible to efficiently use radio resources used in transmission of the SRS.

A mobile station apparatus of the invention is characterized by having a reception section configured to receive an uplink scheduling grant including an instruction for transmission of an SRS from a base station apparatus, a multiplexing section configured to multiplex the SRS into a predetermined symbol in response to the instruction for transmission of the SRS included in the uplink scheduling grant, and a transmission section configured to transmit the SRS multiplexed in the multiplexing section to the base station apparatus.

According to this configuration, since the SRS is transmitted only in the case of receiving notification of the uplink scheduling grant including the instruction for transmission of the SRS, it is possible to dynamically control a subframe into which the SRS is multiplexed, and it is thereby possible to efficiently use radio resources used in transmission of the SRS.

A base station apparatus of the invention is characterized by having a generation section configured to generate an uplink scheduling grant including an instruction for transmission of an SRS, and a transmission section configured to transmit the uplink scheduling grant generated in the generation section to a mobile station apparatus.

According to this configuration, since the uplink scheduling grant including the instruction for transmission of the SRS is transmitted, the base station apparatus is capable of instructing transmission of the SRS by the uplink scheduling grant, it is possible to dynamically control a subframe into which the SRS is multiplexed, and it is thereby possible to efficiently use radio resources used in transmission of the SRS.

Technical Advantages of the Invention

According to the invention, it is possible to provide a reference signal transmission method, mobile station apparatus and base station apparatus for enabling radio resources used in transmission of the SRS to be used efficiently.

BRIEF DESCRIPTION OF DRAWINGS

FIG. 20 contains diagrams to explain transmission power information and extended transmission power control information transmitted in the reference signal transmission method according to the eleventh aspect of the invention;

DESCRIPTION OF EMBODIMENTS

Figure 1:
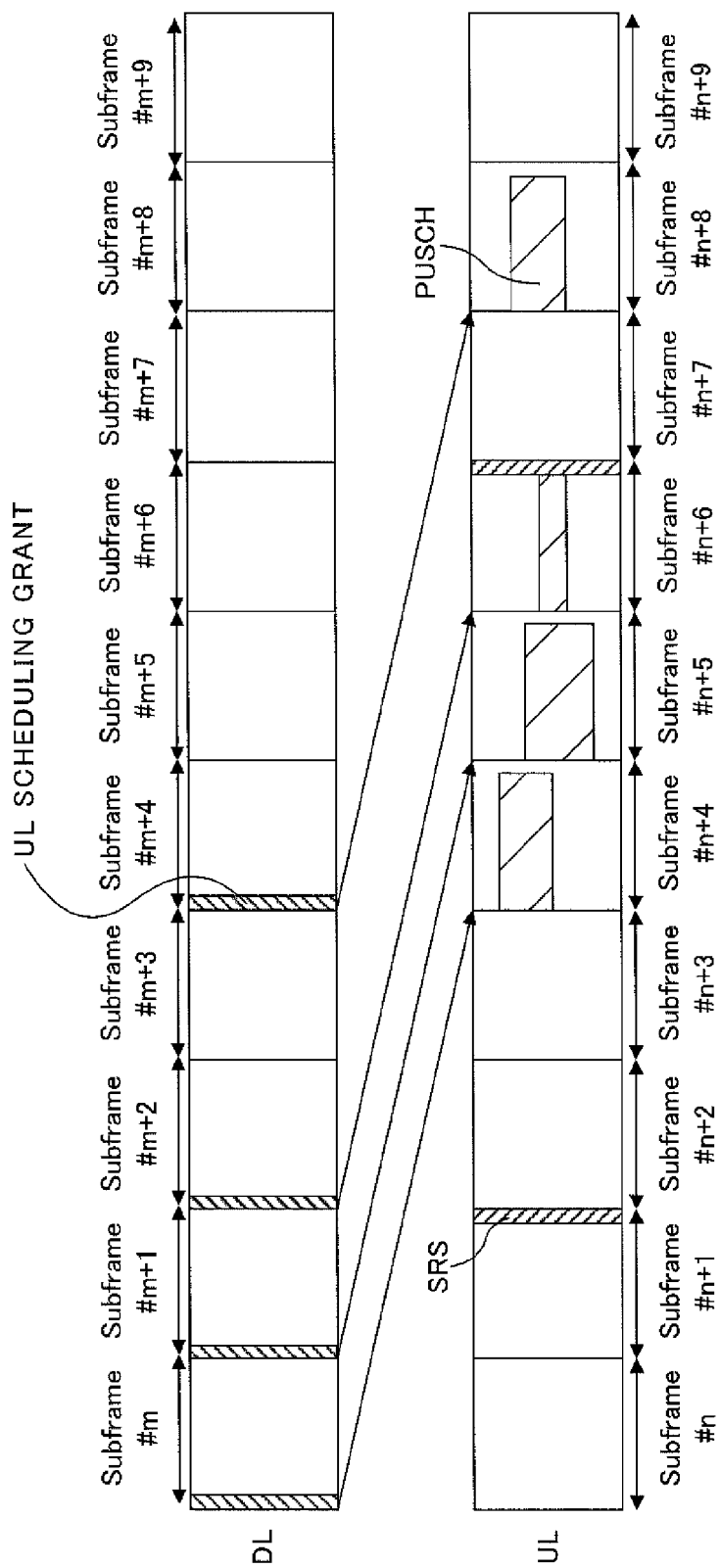
FIG. 1 is a diagram to explain a method of transmitting SRSs in an LTE system.

FIG. 1 is a diagram to explain a method of transmitting Sounding Reference Signals (SRSs) in an LTE system. As shown in FIG. 1, in the LTE system, an SRS for channel quality measurement is multiplexed into a last symbol in some of subframes (subframes #n to #n+9) constituting a radio frame of uplink (UL), and is transmitted periodically at intervals of 5 msec from a mobile station apparatus UE to a base station apparatus eNode B. FIG. 1 shows the case that an SRS is multiplexed into a last symbol of each of subframes #n+1 and #n+6.

Meanwhile, a data channel signal (PUSCH: Physical Uplink Shared Channel) is transmitted 4 TTIs (Transmission Time Intervals) later, after receiving notification of an uplink (UL) scheduling grant on a PDCCH (Physical Downlink Control Channel). Herein, the subframe is a transmission time unit of one data packet subjected to error correcting coding (channel coding), and is equal to 1 TT1. Therefore, upon receiving notification of an UL scheduling grant, the PUSCH is transmitted 4 subframes later. FIG. 1 shows the case where among subframes (subframe number #m to #m+9) constituting a radio frame in downlink (DL), an UL scheduling grant is notified in subframes #m to #m+2 and #m+4, and in response to the UL scheduling grant, the PUSCH is transmitted in subframes #n+4 to #n+6 and #n+8 in uplink (UL).

As shown in FIG. 1, the SRS is transmitted irrespective of the presence or absence of the PUSCH transmitted in each subframe, and therefore, even if there is no notification of the UL scheduling grant and the PUSCH is not transmitted, the SRS is transmitted to the base station apparatus eNode B periodically in uplink (UL). From the viewpoint of efficiently using radio resources, for the SRS with the purpose of measuring channel quality in the base station apparatus eNode B, it is preferable that the SRS is measured when the PUSCH is transmitted. However, in the LTE system, since radio resources used in transmission of SRS are fixedly used irrespective of the presence or absence of the PUSCH, it is difficult to efficiently use radio resources. The inventors of the invention noted the respect that radio resources are used wastefully because the SRS is transmitted irrespective of the presence or absence of the PUSCH, and arrived at the invention.

In other words, in a reference signal transmission method according to the invention, instead of transmitting the SRS periodically, by dynamically controlling the presence or absence of transmission of SRS, it is intended to efficiently use radio resources used in transmission of SRS. More specifically, by instructing a mobile station apparatus UE to transmit the SRS by the UL scheduling grant for instructing the UE to transmit the PUSCH, the subframe into which the SRS is multiplexed is dynamically controlled, and it is made possible to efficiently use radio resources used in transmission of SRS.

A reference signal transmission method according to the invention is to include 1 bit (hereinafter, referred to as a "transmission identification bit") to identify the presence or absence of transmission (transmission ON/OFF) of SRS in a mobile station apparatus UE in a UL scheduling grant notified on a PDCCH from a base station apparatus eNode B. The mobile station apparatus UE controls transmission timing of the SRS dynamically in response to the transmission identification bit. By this means, it is possible to dynamically control the subframe into which the SRS is multiplexed in response to the transmission identification bit of the UL scheduling grant, and it is thereby possible to efficiently use radio resources used in transmission of SRS.

In a reference signal transmission method according to a first aspect of the invention, a base station apparatus eNode B selects an UL scheduling grant in which "1" indicative of transmission ON is assigned to the transmission identification bit, and instructs a mobile station apparatus UE whether or not to transmit an SRS by the selected UL scheduling grant, and the mobile station apparatus UE transmits the SRS in the same subframe as the PUSCH that the UL scheduling grant including the transmission identification bit instructs to transmit.

Figure 2:
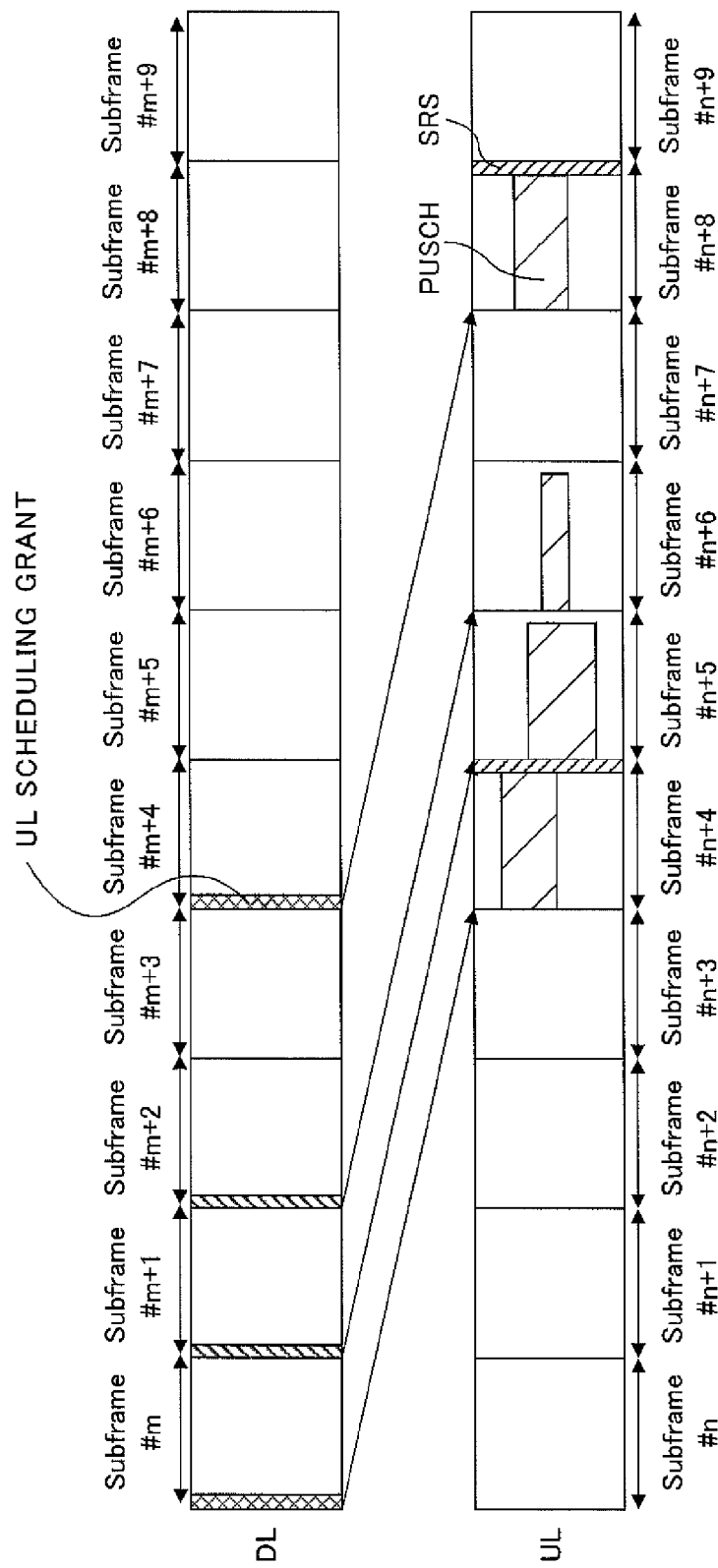
FIG. 2 is a diagram to explain SRSs transmitted in a reference signal transmission method according to a first aspect of the invention.

FIG. 2 is a diagram to explain SRSs transmitted in the reference signal transmission method according to the first aspect. FIG. 2 shows the case where the base station apparatus eNode B selects UL scheduling grants of subframes #m and #m+4 as an UL scheduling grant including instruction(s) for transmission of SRS (in other others, the transmission identification bit of transmission ON). Upon receiving notification of the UL scheduling grant including instructions for transmission of SRS, the mobile station apparatus UE transmits the SRS to the base station apparatus eNode B together with the PUSCH transmitted in subframes #n+4 and #n+8 that are 4 subframes later in response to the UL scheduling grant.

In the reference signal transmission method according to the first aspect, the SRS is transmitted in the same subframe as the PUSCH that the UL scheduling grant including instructions for transmission instructs to transmit, and is therefore multiplexed into the last symbol of each of the subframes #n+4 and #n+8. In other words, the SRS is successively multiplexed subsequent to the PUSCH assigned to the subframes #n+4 and #n+8. The base station apparatus eNode B measures the channel quality based on the SRS that is successively multiplexed after the PUSCH, and performs scheduling for PUSCH transmission in the mobile station apparatus UE. Therefore, the base station apparatus is capable of measuring the channel quality at timing at which the PUSCH is actually transmitted, and therefore, is capable of performing scheduling while reflecting the actual channel state.

In addition, the base station apparatus eNode B selects the UL scheduling grant including instructions for transmission of SRS, in consideration of the presence or absence of an interval of the UL scheduling grant including instructions for transmission of SRS that was transmitted previously, and the like. For example, when a predetermined interval (for example, 4 TTIs) has elapsed since the UL scheduling grant including instructions for transmission that was transmitted previously, the UL scheduling grant including instructions for transmission of SRS is selected as an UL scheduling grant that is next transmitted. In addition, the method of selecting the UL scheduling grant including instructions for transmission of SRS is capable of being modified as appropriate, which is the same as in reference signal transmission methods according to second and third aspects, described later.

In a reference signal transmission method according to a second aspect of the invention, a base station apparatus eNode B selects an UL scheduling grant in which "1" indicative of transmission ON is assigned to the transmission identification bit, and instructs a mobile station apparatus UE whether or not to transmit an SRS by the selected UL scheduling grant, and the mobile station apparatus UE transmits the SRS in a subframe immediately before a subframe of the PUSCH that the UL scheduling grant including the transmission identification bit instructs to transmit.

Figure 3:
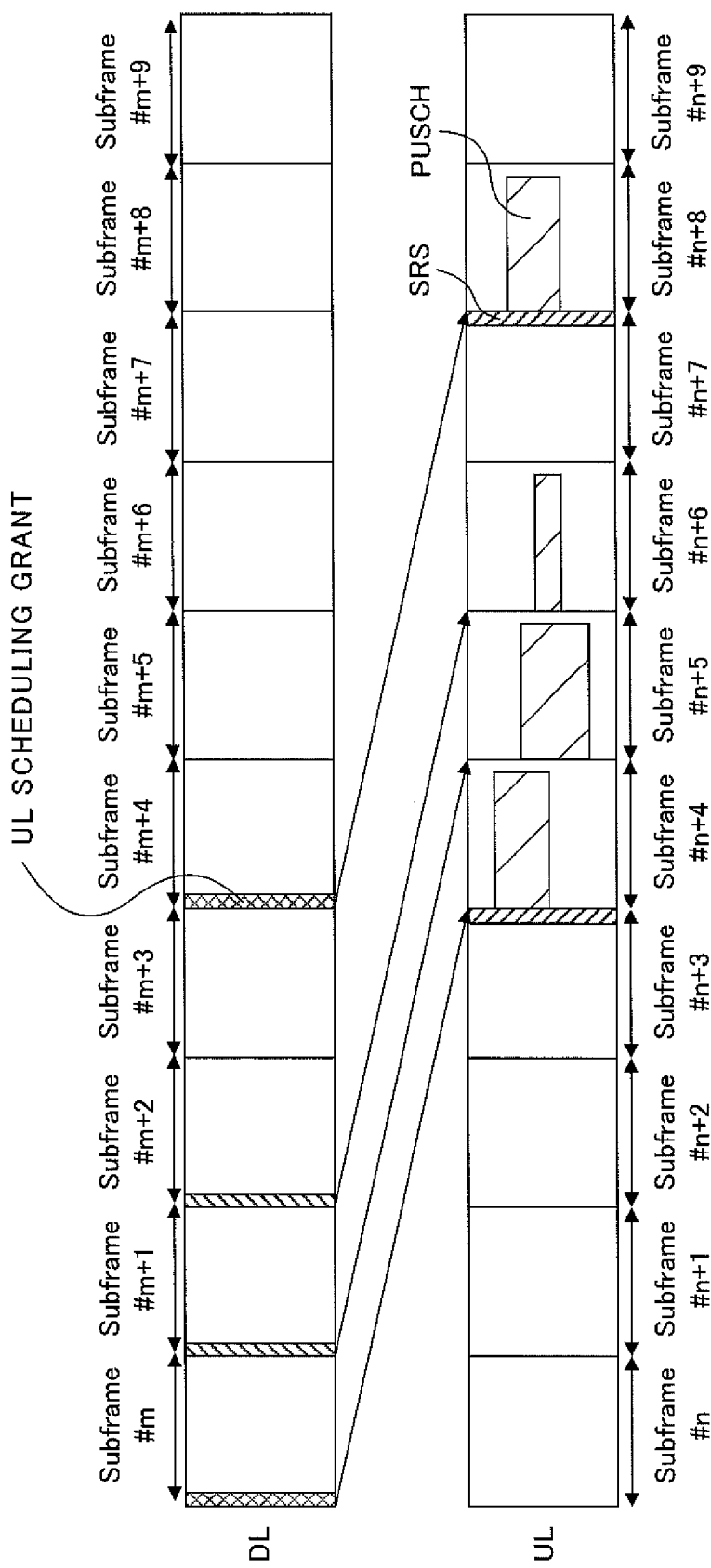
FIG. 3 is a diagram to explain SRSs transmitted in a reference signal transmission method according to a second aspect of the invention.

FIG. 3 is a diagram to explain SRSs transmitted in the reference signal transmission method according to the second aspect. As in FIG. 2, FIG. 3 shows the case where the base station apparatus eNode B selects UL scheduling grants of subframes #m and #m+4 as an UL scheduling grant including instructions for transmission of SRS. Upon receiving notification of the UL scheduling grant including instructions for transmission of SRS, the mobile station apparatus UE transmits the SRS to the base station apparatus eNode B in subframes #n+3 and #n+7 that are respectively immediately before subframes #n+4 and #n+8 to transmit the PUSCH in response to the UL scheduling grant.

In the reference signal transmission method according to the second aspect, the SRS is transmitted in a subframe immediately before a subframe of the PUSCH that the UL scheduling grant including instructions for transmission instructs to transmit, and is therefore multiplexed into the last symbol of each of the subframes #n+3 and #n+7. In other words, the SRS is successively multiplexed prior to the PUSCH assigned to the subframes #n+4 and #n+8. The base station apparatus eNode B measures the channel quality based on the SRS that is successively multiplexed before the PUSCH, and performs scheduling for PUSCH transmission in the mobile station apparatus UE. Therefore, the base station apparatus is capable of measuring the channel quality at timing at which the PUSCH is actually transmitted, and therefore, is capable of performing scheduling while reflecting the actual channel state.

In a reference signal transmission method according to a third aspect of the invention, a base station apparatus eNode B selects an UL scheduling grant in which "1" indicative of transmission ON is assigned to the transmission identification bit, and instructs a mobile station apparatus UE whether or not to transmit an SRS by the selected UL scheduling grant, and the mobile station apparatus UE transmits the SRS in a previous subframe by the predetermined number of subframes before the subframe of the PUSCH that the UL scheduling grant including the transmission identification bit instructs to transmit.

Figure 4:
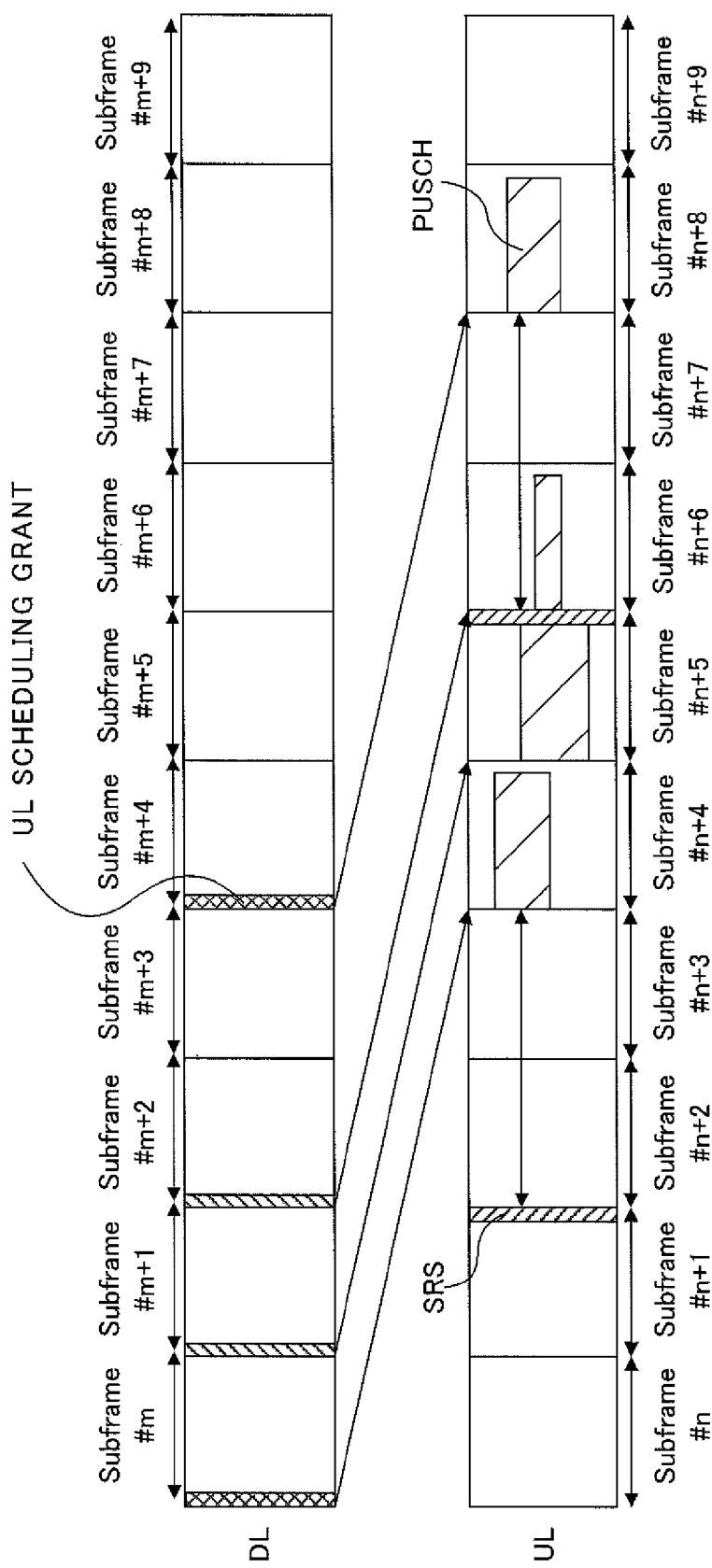
FIG. 4 is a diagram to explain SRSs transmitted in a reference signal transmission method according to a third aspect of the invention.

FIG. 4 is a diagram to explain SRSs transmitted in the reference signal transmission method according to the third aspect. As in FIGS. 2 and 3, FIG. 4 shows the case where the base station apparatus eNode B selects UL scheduling grants of subframes #m and #m+4 as an UL scheduling grant including instructions for transmission of SRS. Upon receiving notification of the UL scheduling grant including instructions for transmission of SRS, the mobile station apparatus UE transmits the SRS to the base station apparatus eNode B in subframes #n+1 and #n+5 that are previous subframes by the predetermined number of subframes (herein 3 subframes) before the subframes #n+4 and #n+8 to transmit the PUSCH in response to the UL scheduling grant.

In the reference signal transmission method according to the third aspect, the SRS is transmitted in a subframe 3-subframe before the subframe of the PUSCH that the UL scheduling grant including instructions for transmission instructs to transmit, and is therefore multiplexed into the last symbol of each of the subframes #n+1 and #n+5. In other words, the SRS is multiplexed prior to the PUSCH assigned to the subframes #n+4 and #n+8. The base station apparatus eNode B measures the channel quality based on the SRS that is multiplexed prior to the PUSCH, and performs scheduling for PUSCH transmission in the mobile station apparatus UE. Therefore, the base station apparatus is capable of measuring the channel quality at timing approximating the timing at which the PUSCH is actually transmitted, and is capable of reflecting the content of scheduling in the subsequent UL scheduling grant including instructions for transmission.

The description will be given using a specific example as shown in FIG. 4. The base station apparatus eNode B measures the channel quality based on the SRS multiplexed into the last symbol of the subframe #n+1 transmitted from the mobile station apparatus UE, and based on a measurement result of the channel quality, performs scheduling for PUSCH transmission in the mobile station apparatus UE. Herein, it is possible to perform scheduling prior to the subframe #m+4 to which the UL scheduling grant including instructions for transmission of SRS is next assigned, and it is thereby possible to reflect the content of this scheduling in the UL scheduling grant of the subframe #m+4.

In addition, in the reference signal transmission method according to the third aspect, the case is shown where the mobile station apparatus UE transmits the SRS in a previous subframe by the predetermined number of subframes before the subframe of the PUSCH that the UL scheduling grant including instructions for transmission instructs to transmit, but it is also possible to transmit the SRS in a later subframe by the predetermined number of subframes after the subframe of the PUSCH that the UL scheduling grant including instructions for transmission instructs to transmit. By thus providing transmission timing of SRS with flexibility, it is possible to adjust inter-user interference and the like. The reference signal transmission method according to the third aspect is to transmit the SRS in a previous or later subframe by the predetermined number of subframes before or after the subframe of the PUSCH that the UL scheduling grant instructs to transmit.

In a reference signal transmission method according to a fourth aspect of the invention, a base station apparatus eNode B selects an UL scheduling grant in which "1" indicative of transmission ON is assigned to the transmission identification bit, and instructs a mobile station apparatus UE whether or not to transmit an SRS by the selected UL scheduling grant, and with reference to a previous subframe by the predetermined number of subframes before the subframe of the PUSCH that UL scheduling grant including the transmission identification bit instructs to transmit, the mobile station apparatus UE transmits the SRS in the first SRS-transmittable subframe from the reference subframe.

Figure 5:
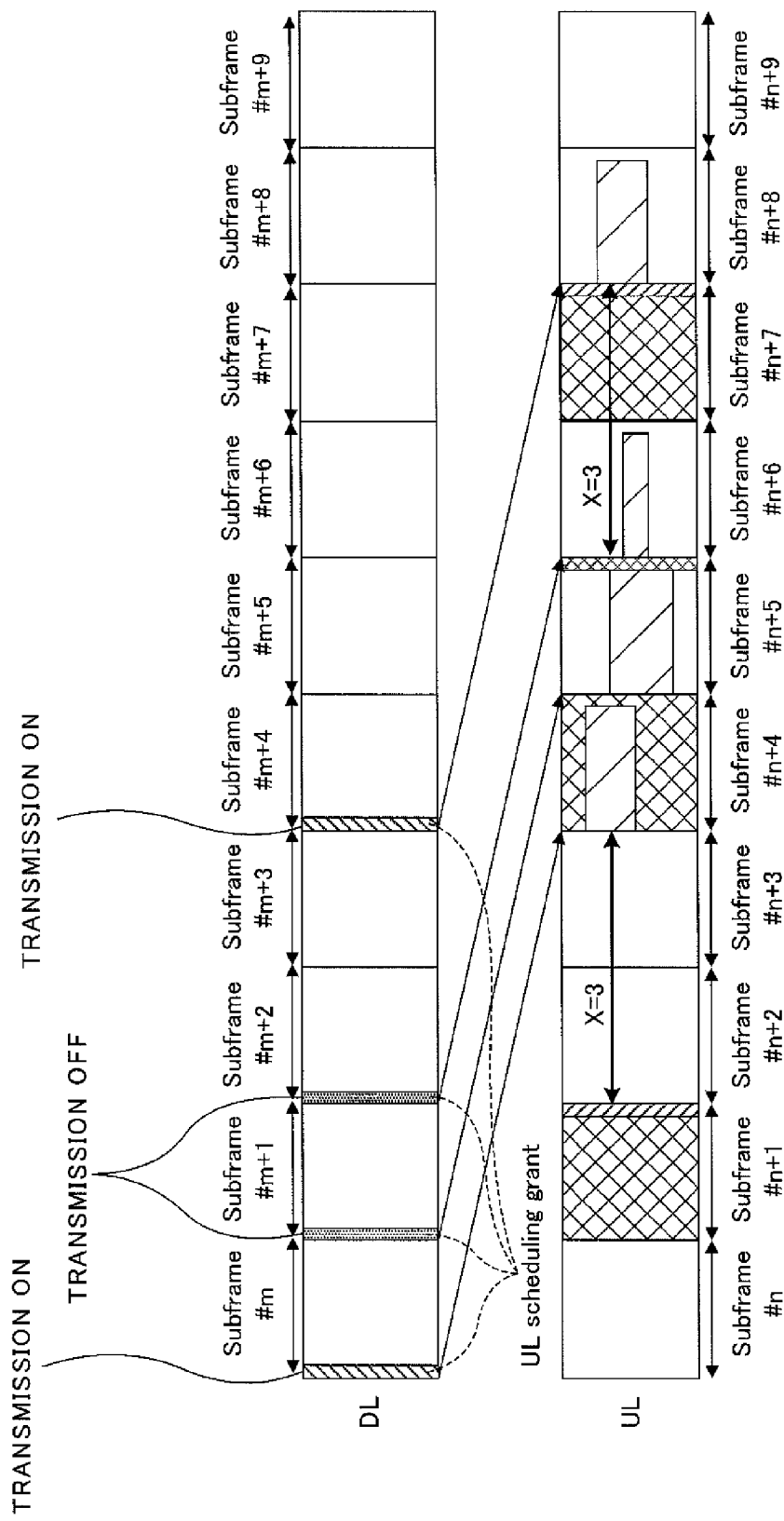
FIG. 5 is a diagram to explain a subframe with an SRS multiplexed in a reference signal transmission method according to a fourth aspect of the invention.

FIG. 5 is a diagram to explain SRSs transmitted in the reference signal transmission method according to the fourth aspect. As in FIGS. 2 and 3, FIG. 5 shows the case where the base station apparatus eNode B selects UL scheduling grants of subframes #m and #m+4 as an UL scheduling grant including instructions for transmission of SRS. Further, in uplink, subframes (#n+1, #n+4, #n+7) are allowed to transmit the SRS. Since transmission of SRS is restricted in subframes used in transmission of broadcast information and RRC control information, subframes allowed to transmit the SRS are beforehand limited. In the example as shown in FIG. 5, the mobile station apparatus UE receives the UL scheduling grant including instructions for transmission of SRS in the subframe #m in downlink, and transmits the PUSCH in the subframe #n+4 by four subframes later after the subframe #m. As a reference, using the subframe #n+1 that is an x-subframe (in the figure, x=3) previous subframe from the subframe #n+4 to transmit the PUSCH, the SRS is transmitted in the first SRS-transmittable subframe from the reference subframe #n+1. In the example as shown in FIG. 5, the reference subframe #n+1 is the first SRS-transmittable subframe. Further, the mobile station apparatus UE receives the UL scheduling grant including instructions for transmission of SRS in the subframe #m+4 in downlink, and transmits the PUSCH in the subframe #n+8 by four subframes later after the subframe #m+4. As a reference, using a subframe #n+5 that is a 3-subframe previous subframe from the subframe #n+8 to transmit the PUSCH, the SRS is transmitted in the first SRS-transmittable subframe from the reference subframe #n+5. In the example as shown in FIG. 5, the reference subframe #n+5 is not the first SRS-transmittable subframe. The first SRS-transmittable subframe from the reference subframe #n+5 is a subframe #n+7, and the SRS is transmitted in the subframe #n+7.

Thus, by applying the rule for transmitting the SRS in the first SRS-transmittable subframe from the reference subframe, even when the broadcast information and RRC control information is transmitted in a previous subframe by the predetermined number of subframes before the subframe to transmit the PUSCH, it is possible to avoid a collision with the SRS.

In the reference signal transmission methods according to the first to fourth aspects, the subframe to transmit the SRS is specified in response to the UL scheduling grant including instructions for transmission of SRS (for example, in the reference signal transmission method according to the first aspect, 4 subframes later). In this case, as a method of specifying a subframe to transmit the SRS, the information for specifying the subframe may be included in the UL scheduling grant. Alternatively, the information for specifying the subframe may be defined in the mobile station apparatus UE by specifications, so that the subframe is specified by the specifications in response to reception of the UL scheduling grant. In the case of specifying a subframe to transmit the SRS in response to the information included in the UL scheduling grant, it is also possible to switch between the reference signal transmission methods according to the first to fourth aspects to apply.

In addition, in the LTE system, resource information (hereinafter, referred to as "SRS multiplexing information") to multiplex SRSs from a plurality of mobile station apparatus UEs into the same symbol is notified to each mobile station apparatus UE by RRC signaling. For example, the SRS multiplexing information includes position information (Comb: 1 bit) indicating whether the subframe to multiplex the SRS is an odd-numbered subframe or an even-numbered subframe, a shift amount (cyclic Shift: 3 bits) assigned to each mobile station apparatus UE in code-multiplexing the SRS, bandwidth (2 bits) targeted for multiplexing the SRS, and a frequency position (indeterminate bit) to multiplex the SRS.

In the reference signal transmission method according to the invention for dynamically controlling transmission timing of SRS, it is preferable to notify such SRS multiplexing information with an UL scheduling grant (PDCCH). However, in the case of including all the SRS multiplexing information in the UL scheduling grant to notify, it is conceivable that the information amount assigned to the UL scheduling grant increases, and that efficiency of generation of the UL scheduling grant and the like deteriorates in the base station apparatus eNode B. Therefore, in the reference signal transmission method according to the invention, the SRS multiplexing information is notified by using both higher layer signaling (RRC signaling) and the UL scheduling grant (PDCCH).

For example, in the reference signal transmission method according to the invention, the position information (Comb: 1 bit) of the subframe to multiplex the SRS and the bandwidth (2 bits) targeted for multiplexing the SRS is notified by RRC signaling, while the shift amount (cyclic Shift: 3 bits) assigned to each mobile station apparatus UE, and the frequency position (variable bit) to multiplex the SRS are notified with the UL scheduling grant (PDCCH). In this case, it is possible to notify the mobile station apparatus UE of the SRS multiplexing information included in the UL scheduling grant (PDCCH) earlier than the SRS multiplexing information included in RRC signaling, and the mobile station apparatus UE is capable of promptly performing control using the SRS multiplexing information. In addition, the SRS multiplexing information assigned to RRC signaling and the UL scheduling grant (PDCCH) is not particularly limited, and is capable of being modified as appropriate.

Further, in the case of notifying the SRS multiplexing information by using both higher layer signaling and the PDCCH, it is preferable to notify the SRS multiplexing information transmitted on the PDCCH using other control bits on the PDCCH. Aspects of using other control bits include both overwriting other control bits with the SRS multiplexing information and using other control bits as the SRS multiplexing information. For example, as an example, the case will be described where the bandwidth (2 bits) and the frequency position (variable bit) are notified using RRC signaling, and instructions for transmission of SRS, the position information (Comb: 1 bit) of the subframe and the shift amount (cyclic Shift: 3 bits) are notified using the PDCCH. For the instructions for transmission of SRS, 1 bit reserved on the PDCCH is used. The position information (Comb: 1 bit) of the subframe and shift amount (cyclic Shift: 3 bits) that are remaining resource information are written over the other control bits. Alternatively, the other control bits are used.

Figure 6:
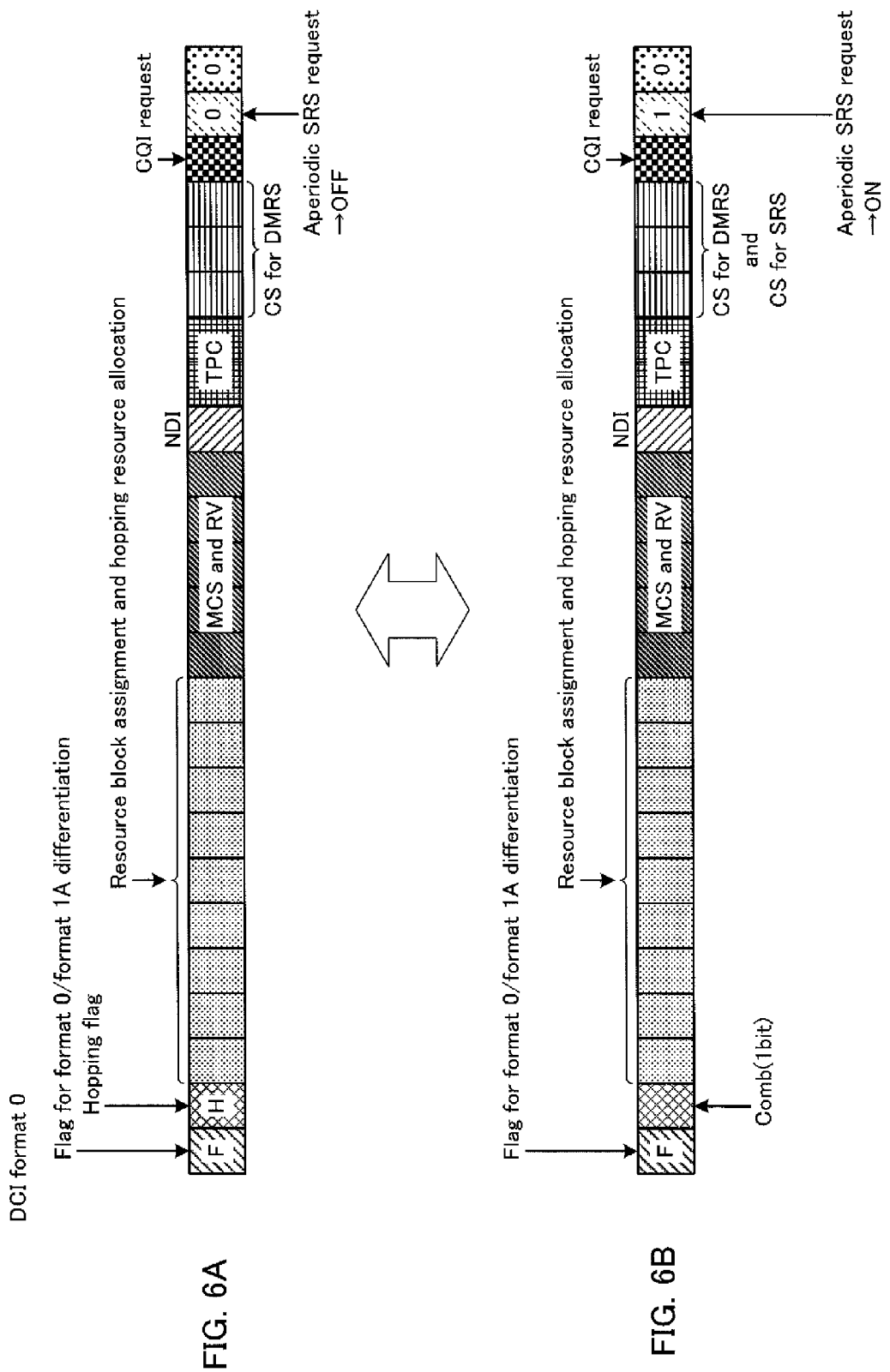
FIG. 6 contains diagrams to explain a symbol to multiplex an SRS in the reference signal transmission method according to the fourth aspect of the invention.

FIG. 6 shows a format configuration (DCI format 0) of an UL scheduling grant transmitted on the PDCCH. FIG. 6A shows a format when instructions for transmission of SRS are OFF, and FIG. 6B shows a format when instructions for transmission of SRS are ON. As shown in FIG. 6A, in DCI format 0, the first 1 bit is a flag to identify DCI Format 1 or DCI Format 0. The second bit is a control bit indicative of the presence or absence of frequency hopping on an uplink control channel. The third to ninth bits are control bits for resource block assignment information indicative of resource block positions assigned to the user. Subsequent to the bits, control bits for MCS information for assigned resource blocks and redundancy version (RV) are arranged, and 1 bit of an identifier (New data indicator) to distinguish between new data and retransmission data is arranged. Further, control bits for a transmission power control command (TPC) of the PUSCH and cyclic shift (CS for DMRS) for a demodulation reference signal are arranged, and a CQI request is arranged. Next to the CQI request, 2 bits are added as padding bits. The first bit of the padding bits is used for instructions for transmission of SRS. SRS transmission is OFF when the control bit is "0", while being ON when the control bit is "1". As shown in FIG. 6B, when instruction for transmission of SRS is ON, "1" is set on the first bit of the padding bits. The position information (Comb: 1 bit) of the subframe is written over the control bit (second bit) indicative of the presence or absence of frequency hopping. For the shift amount (cyclic Shift: 3 bits) are used the control bits of the cyclic shift (CS for DMRS) for a demodulation reference signal that are the same number of bits as the shift amount. In other words, the shift amount for SRS multiplexing and the cyclic shift (CS for DMRS) for a demodulation reference signal are linked and are made the same bit value. In this way, it is possible to notify the SRS multiplexing information transmitted on the PDCCH by using the other control bits on the PDCCH, and it is possible to prevent the number of bits of the UL scheduling grant (DCI format 0) from increasing.

Figure 7:
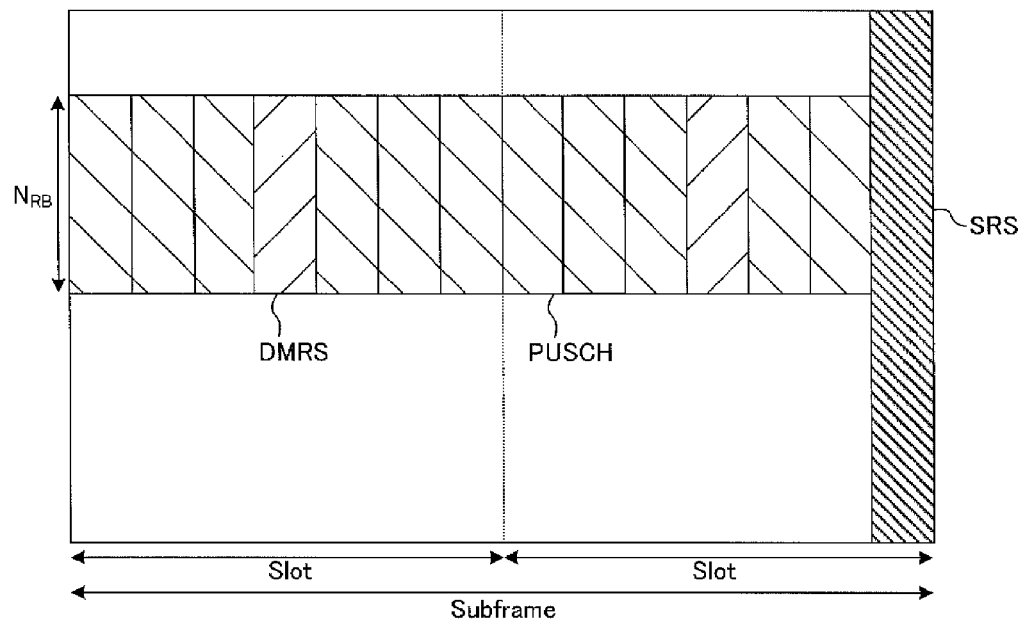
FIG. 7 is a diagram to explain a subframe with an SRS multiplexed in the reference signal transmission method according to the first aspect of the invention.

Further, in the reference signal transmission methods according to the first to fourth aspects, the SRS is multiplexed into the last symbol of the particular subframe in response to the UL scheduling grant notified from the base station apparatus eNode B. For example, as shown in FIG. 7, the SRS is multiplexed into the last symbol of the corresponding subframe The PUSCH is multiplexed into a resource block ($N_{RB}$) assigned to the mobile station apparatus UE. The DMRS (Demodulation Reference Signal) is multiplexed into a third symbol in each slot in the resource block ($N_{RB}$) assigned to the mobile station apparatus UE. In addition, FIG. 7 shows the subframe into which the SRS in the reference signal transmission method according to the first aspect is multiplexed. Described herein is the reference signal transmission method according to the first aspect as an example, and the reference signal transmission methods according to the second to fourth aspects are also in the same manner.

However, in the reference signal transmission methods according to the first to fourth aspects, since a symbol allowed to multiplex the SRS is limited to the last symbol of a subframe, and therefore, for example, when the mobile station apparatus UE is positioned at the edge of the cell to which the apparatus UE belongs, such an event may occur that the mobile station apparatus UE lacks transmission power and that the base station apparatus eNode B is not able to receive the SRS properly. To support such an event, in reference signal transmission methods according to fifth to eighth aspects of the invention, the SRS is multiplexed into a plurality of symbols different from the last symbol.

Figure 8:
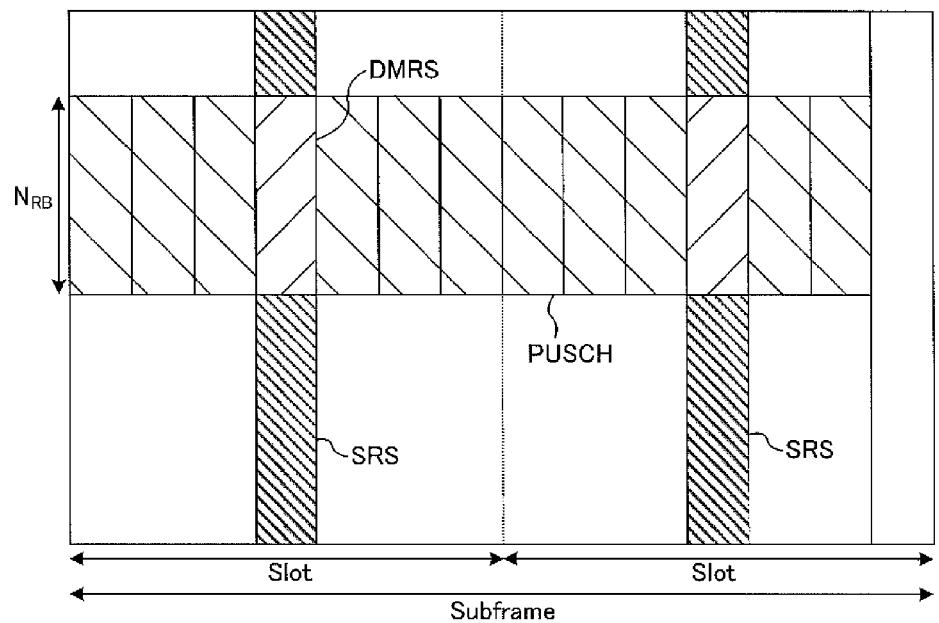
FIG. 8 is a diagram to explain a symbol to multiplex an SRS in a reference signal transmission method according to a fifth aspect of the invention.

In the reference signal transmission method according to the fifth aspect of the invention, the SRS is multiplexed by overlapping with the DMRS of the corresponding subframe. FIG. 8 is a diagram to explain a symbol to multiplex the SRS in the reference signal transmission method according to the fifth aspect of the invention. As shown in FIG. 8, in the fifth reference signal transmission method, the SRS is multiplexed into the third symbol of each of slots constituting the corresponding subframe, and is transmitted to the base station apparatus eNode B concurrently with the DMRS. In addition, it is possible to actualize multiplexing of the SRS overlapped with the DMRS, for example, using a code orthogonal to the DMRS and the like.

Thus, in the reference signal transmission method according to the fifth aspect, since a plurality of SRSs (2 SRSs) is multiplexed and transmitted in the subframe specified by the UL scheduling grant including instructions for transmission of SRS, it is made easier that the base station apparatus eNode B properly receives the SRS, as compared with the case of multiplexing the SRS only into the last symbol.

Figure 9:
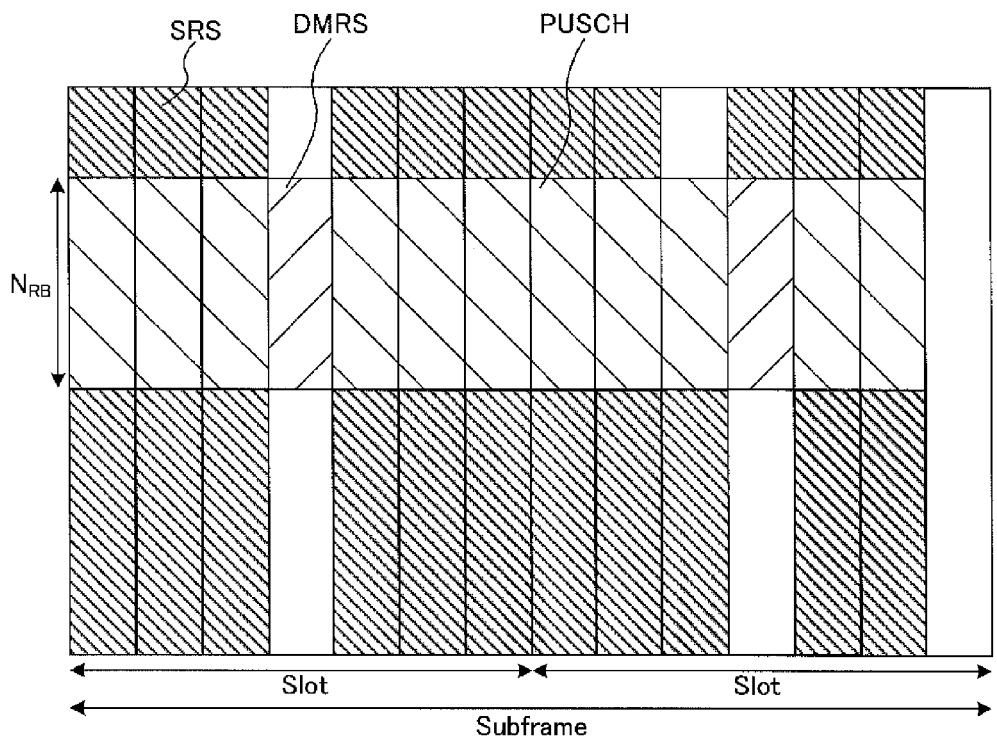
FIG. 9 is a diagram to explain a symbol to multiplex an SRS in a reference signal transmission method according to a sixth aspect of the invention.

In the reference signal transmission method according to the sixth aspect of the invention, the SRS is multiplexed by overlapping with the PUSCH of the corresponding subframe. FIG. 9 is a diagram to explain a symbol to multiplex the SRS in the reference signal transmission method according to the sixth aspect of the invention. As shown in FIG. 9, in the sixth reference signal transmission method, the SRS is multiplexed into all symbols except the third symbol of each of slots constituting the corresponding subframe and the last symbol of the corresponding subframe, and is transmitted to the base station apparatus eNode B concurrently with the PUSCH. In this case, it is preferable to transmit the SRS with lower transmission power than the PUSCH.

Thus, in the reference signal transmission method according to the sixth aspect, since a plurality of SRSs (11 SRSs) is multiplexed and transmitted in the subframe specified by the UL scheduling grant including instructions for transmission of SRS, it is made easier that the base station apparatus eNode B properly receives the SRS, as compared with the case of multiplexing the SRS only into the last symbol. Further, since the SRS is multiplexed with the PUSCH, it is made hard to exert the effect on measurement accuracy of the channel quality in the base station apparatus eNode B, as compared with the case of multiplexing the SRS with the DMRS.

Figure 10:
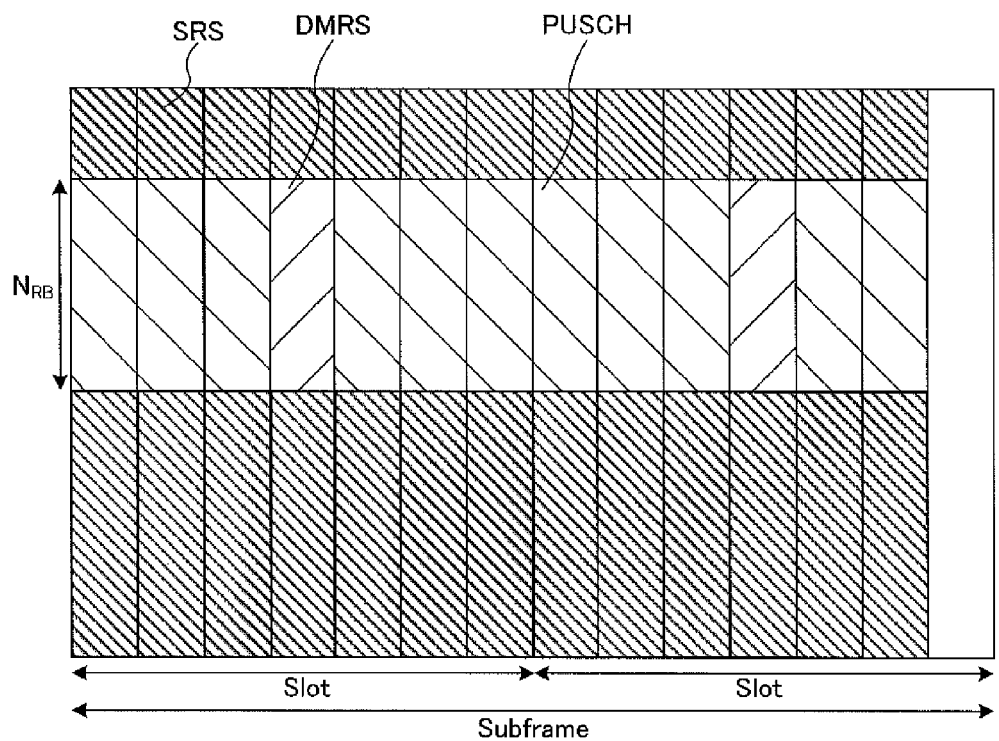
FIG. 10 is a diagram to explain a symbol to multiplex an SRS in a reference signal transmission method according to a seventh aspect of the invention.

In the reference signal transmission method according to the seventh aspect of the invention, the SRS is multiplexed by overlapping with the DMRS and the PUSCH of the corresponding subframe. In other words, this method corresponds to a reference signal transmission method obtained by combining the reference signal transmission method according to the fifth aspect, and the reference signal transmission method according to the sixth aspect. FIG. 10 is a diagram to explain a symbol to multiplex the SRS in the reference signal transmission method according to the seventh aspect of the invention. As shown in FIG. 10, in the seventh reference signal transmission method, the SRS is multiplexed into all symbols except the last symbol of the corresponding subframe, and is transmitted to the base station apparatus eNode B together with the PUSCH and DMRS.

Thus, in the reference signal transmission method according to the seventh aspect, since a plurality of SRSs (13 SRSs) is multiplexed and transmitted in the subframe specified by the UL scheduling grant including instructions for transmission of SRS, it is made easier that the base station apparatus eNode B properly receives the SRS, as compared with the case of multiplexing the SRS only into the last symbol. Particularly, since the SRS is multiplexed into all symbols except the last symbol of the subframe, it is possible to further make it easier that the base station apparatus eNode B receives the SRS, as compared with the case of multiplexing the SRS only with the PUSCH or only with the DMRS.

Figure 11:
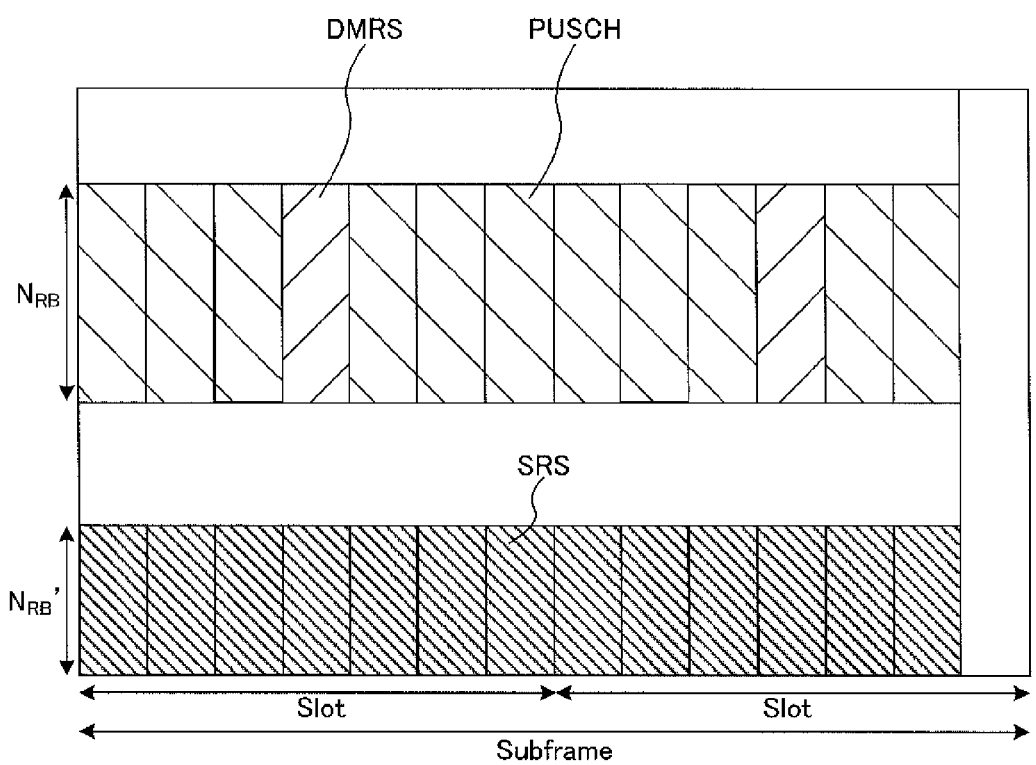
FIG. 11 is a diagram to explain a symbol to multiplex an SRS in a reference signal transmission method according to an eighth aspect of the invention.

In the reference signal transmission method according to the eighth aspect of the invention, the SRS is multiplexed into a resource block different from the resource block assigned to the mobile station apparatus UE in the corresponding subframe. FIG. 11 is a diagram to explain a symbol to multiplex the SRS in the reference signal transmission method according to the eighth aspect of the invention. As shown in FIG. 11, in the eighth reference signal transmission method, the SRS is multiplexed into all symbols except the last symbol of the subframe in the resource block ($N_{RB}$') different from the resource block ($N_{RB}$) assigned to the mobile station apparatus UE, and is transmitted to the base station apparatus eNode B together with the PUSCH and DMRS.

Thus, in the reference signal transmission method according to the eighth aspect, since a plurality of SRSs (13 SRSs) is multiplexed and transmitted in the subframe specifed by the UL scheduling grant including instructions for transmission of SRS, it is made easier that the base station apparatus eNode B properly receives the SRS, as compared with the case of multiplexing the SRS only into the last symbol. Further, since the SRS is multiplexed into the resource block ($N_{RB}$') different from the resource block ($N_{RB}$) assigned to the mobile station apparatus UE, it is possible to suppress interference on the PUSCH, as compared with the case of multiplexing with the PUSCH.

In addition, in the case of thus dynamically selecting symbols to multiplex the SRS, it is also possible to select symbols to multiplex the SRS from the viewpoint of demodulation accuracy of the data channel signal (PUSCH) in the base station apparatus eNode B. Generally, in the data channel signal, there is a tendency that demodulation accuracy deteriorates in symbols in edge portions of a subframe. Therefore, it is preferable as an Embodiment to multiplex the SRS irrelevant to the data channel signal into symbols in which demodulation accuracy deteriorates. Aspects for thus multiplexing the SRS will be described below.

Figure 17:
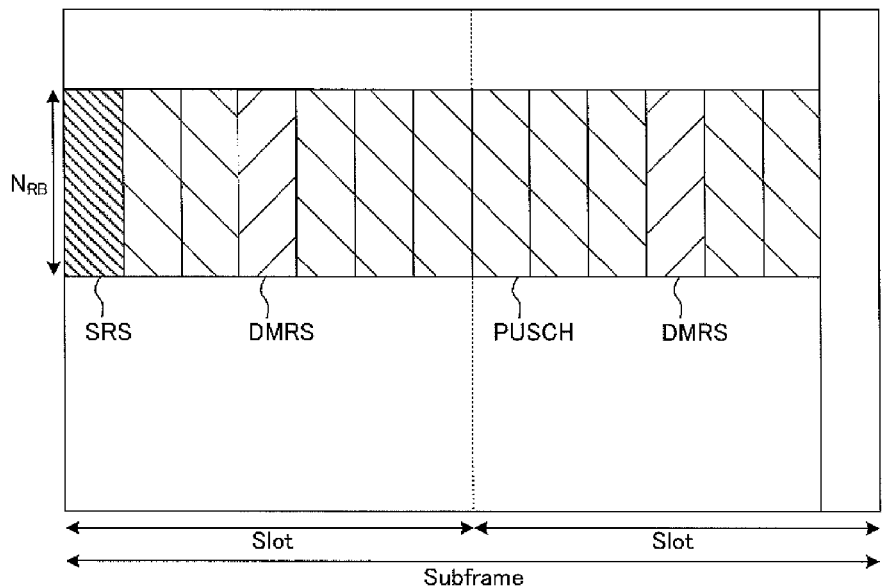
FIG. 17 is a diagram to explain a symbol to multiplex an SRS in a reference signal transmission method according to a ninth aspect of the invention.

In a reference signal transmission method according to a ninth aspect of the invention, the SRS is multiplexed into a beginning symbol of the PUSCH in the corresponding subframe. FIG. 17 is a diagram to explain a symbol to multiplex the SRS in the reference signal transmission method according to the ninth aspect of the invention. As shown in FIG. 17, in the ninth reference signal transmission method, the SRS is multiplexed into the resource block ($N_{RB}$) assigned to the mobile station apparatus UE in the beginning symbol (0th symbol) of the corresponding subframe, and is transmitted to the base station apparatus eNode B together with the PUSCH.

Thus, in the reference signal transmission method according to the ninth aspect, the SRS is multiplexed into the beginning symbol of the PUSCH and transmitted in the subframe specified by the UL scheduling grant including instructions for transmission of SRS. In the case of thus transmitting the data channel signal (PUSCH), since the SRS is multiplexed into the symbol in which demodulation accuracy tends to deteriorate, it is possible to suppress deterioration of demodulation accuracy of the data channel signal, while efficiently using radio resources.

Figure 18:
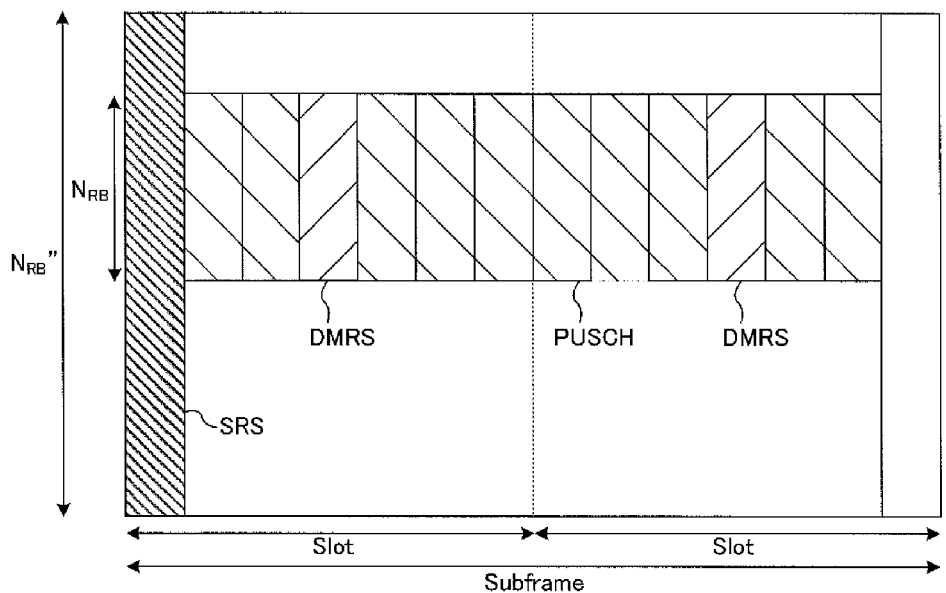
FIG. 18 is a diagram to explain a symbol to multiplex an SRS in a reference signal transmission method according to a tenth aspect of the invention.

In a reference signal transmission method according to a tenth aspect of the invention, the SRS is multiplexed by overlapping with a beginning symbol of the PUSCH in the corresponding subframe. FIG. 18 is a diagram to explain a symbol to multiplex the SRS in the reference signal transmission method according to the tenth aspect of the invention. As shown in FIG. 18, in the tenth reference signal transmission method, the SRS is multiplexed into a resource block ($N_{RB}$") with a wide band including the resource block ($N_{RB}$) assigned to the mobile station apparatus UE in the beginning symbol (0th symbol) of the corresponding subframe, and is transmitted to the base station apparatus eNode B together with the PUSCH.

Thus, in the reference signal transmission method according to the tenth aspect, the SRS is multiplexed into the beginning symbol of the PUSCH and transmitted in the subframe specified by the UL scheduling grant including instructions for transmission of SRS. In the case of thus transmitting the data channel signal (PUSCH), as in the reference signal transmission method according to the ninth aspect, it is possible to suppress deterioration of demodulation accuracy of the data channel signal, while efficiently using radio resources. Further, in the reference signal transmission method according to the tenth aspect, it is possible to measure the channel quality based on the SRS multiplexed into the resource block ($N_{RB}$") with a wide band including the resource block ($N_{RB}$) assigned to the mobile station apparatus UE, and it is thereby possible to improve measurement accuracy of the channel quality.

In the reference signal transmission methods according to the first to tenth aspects as described above, the mobile station apparatus UE transmits the SRS in response to instructions for transmission of SRS included in the UL scheduling grant. However, as described in a reference signal transmission method according to an eleventh aspect, the mobile station apparatus UE may transmit the SRS in response to instructions for transmission of SRS included in a scheduling grant other than the UL scheduling grant.

In the reference signal transmission method according to the eleventh aspect, a scheduling grant for SRS is provided, and the mobile station apparatus UE transmits the SRS in response to instructions for transmission of SRS included in the scheduling grant for SRS.

Figure 19A:
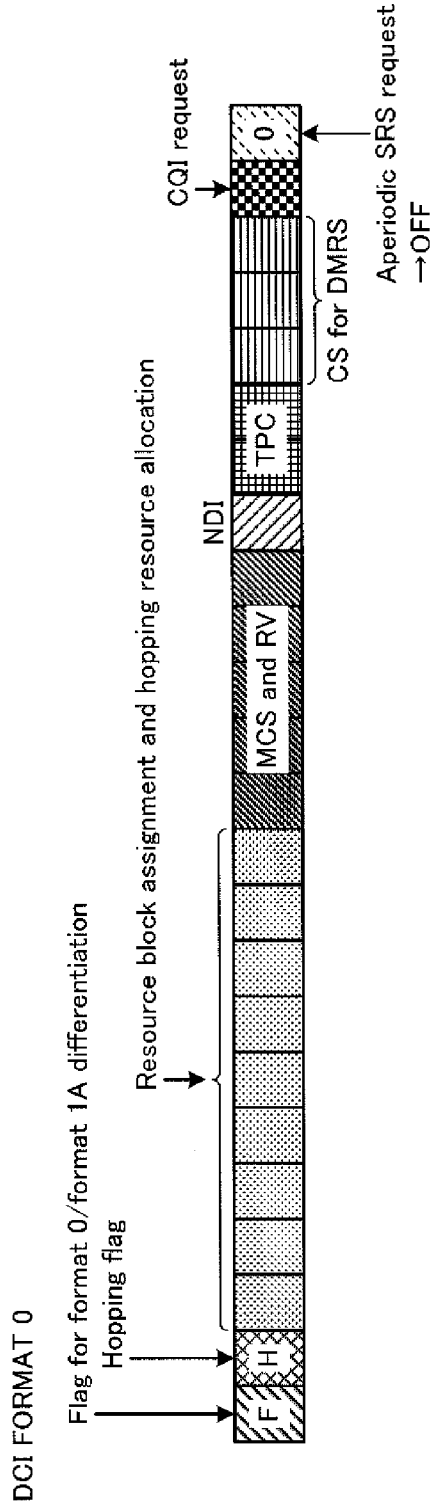
FIG. 19 contains diagrams to explain a scheduling grant transmitted in a reference signal transmission method according to an eleventh aspect of the invention.
Figure 19B:
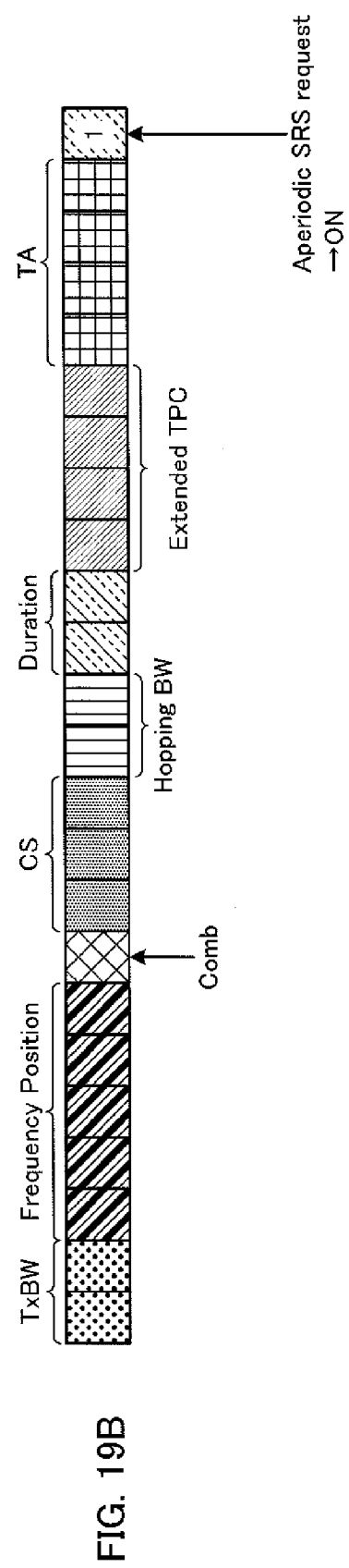

FIG. 19 contains diagrams to explain a format configuration of the scheduling grant (also referred to as an Aperiodic SRS grant) for SRS used in the reference signal transmission method according to the eleventh aspect of the invention. FIG. 19A illustrates a format configuration of the UL scheduling grant, and FIG. 19B illustrates a format configuration of the scheduling grant for SRS. The UL scheduling grant of FIG. 19A has the same configuration as the UL scheduling grant of the case that instructions for transmission of SRS are OFF as shown in FIG. 6A. The scheduling grant for SRS as shown in FIG. 19B is to notify the mobile station apparatus UE of scheduling information to transmit the SRS as described specifically below.

As shown in FIG. 19B, the TxBW (TxBandwidth) of 1st and 2nd bits of the scheduling grant for SRS is a transmission bandwidth of the SRS. The Frequency position of 3rd to 7th bits is a frequency position to transmit the SRS. The Comb of the 8th bit is position information of a subframe to transmit the SRS. The CS (Cyclic shift) of 9th to 11th bits is a shift amount of the cyclic shift of the SRS. The Hopping BW (Bandwidth) of 12th and 13th bits is a band for frequency hopping. The Duration of 14th and 15th bits is a transmission period of the SRS. The aforementioned resource information to transmit the SRS is notified by RRC signaling in principle, because of constrains of the information amount of the UL scheduling grant, in the reference information transmission methods according to the first to tenth aspects. In the reference information transmission method according to the eleventh aspect, since the scheduling grant for SRS is provided, it is possible to notify the mobile station apparatus UE of the resource information to transmit the SRS on the PDCCH.

Further, as shown in FIG. 19B, the scheduling grant for SRS is capable of including transmission control information (for example, extended transmission power control information (Extended TPC), transmission timing control information (TA), described later, etc.) to control transmission of not only the SRS but also the data channel signal (PUSCH). In addition, the scheduling grant for SRS may include either the extended transmission power control information (Extended TPC) or the transmission timing control information (TA), described later, or may include both information.

The Extended TPC of 16th to 19th bits of FIG. 19B is extended transmission power control information to control transmission power of the SRS and/or data channel signal (PUSCH) in the extended control range. FIG. 20 contains diagrams to explain the extended transmission power control information (Extended TPC). FIG. 20A shows the content of the transmission power control information (TPC) included in the UL scheduling grant of FIG. 19A. The transmission power control information (TPC) of 2 bits increases and decreases transmission power in 4 levels. Meanwhile, FIG. 20B shows the content of the extended transmission power control information (Extended TPC) included in the scheduling grant for SRS of FIG. 19B. The extended transmission power control information (TPC) of 4 bits increases and decreases transmission power in 16 levels. According to the extended transmission power control information (Extended TPC), since the number of bits increases from 2 bits to 4 bits, it is possible to control transmission power of the SRS and/or data channel signal (PUSCH) in a wider control range than the transmission power control information (TPC). In addition, the extended transmission power control information (Extended TPC) is not limited to 4 bits, and may be 3 bits, or 5 bits or more.

The TA (Timing Advance) of 20th to 23rd bits of FIG. 19B is transmission timing control information to control transmission timing of the SRS and/or data channel signal (PUSCH). In addition, the transmission timing control information (TA) is usually included in an RACH response transmitted from the base station apparatus eNode B at the time of initial access of a mobile station apparatus UE. The transmission timing control information (TA) is notified to the mobile station apparatus UE also by the scheduling grant for SRS, and it is thereby possible to prevent the occurrence of error of transmission timing control which is caused by elapsed time since initial access.

A 24th bit of FIG. 19B is a control bit used in instructions for transmission of SRS. In the scheduling grant for SRS, "1" indicative of requesting transmission of SRS is set.

Figure 21:
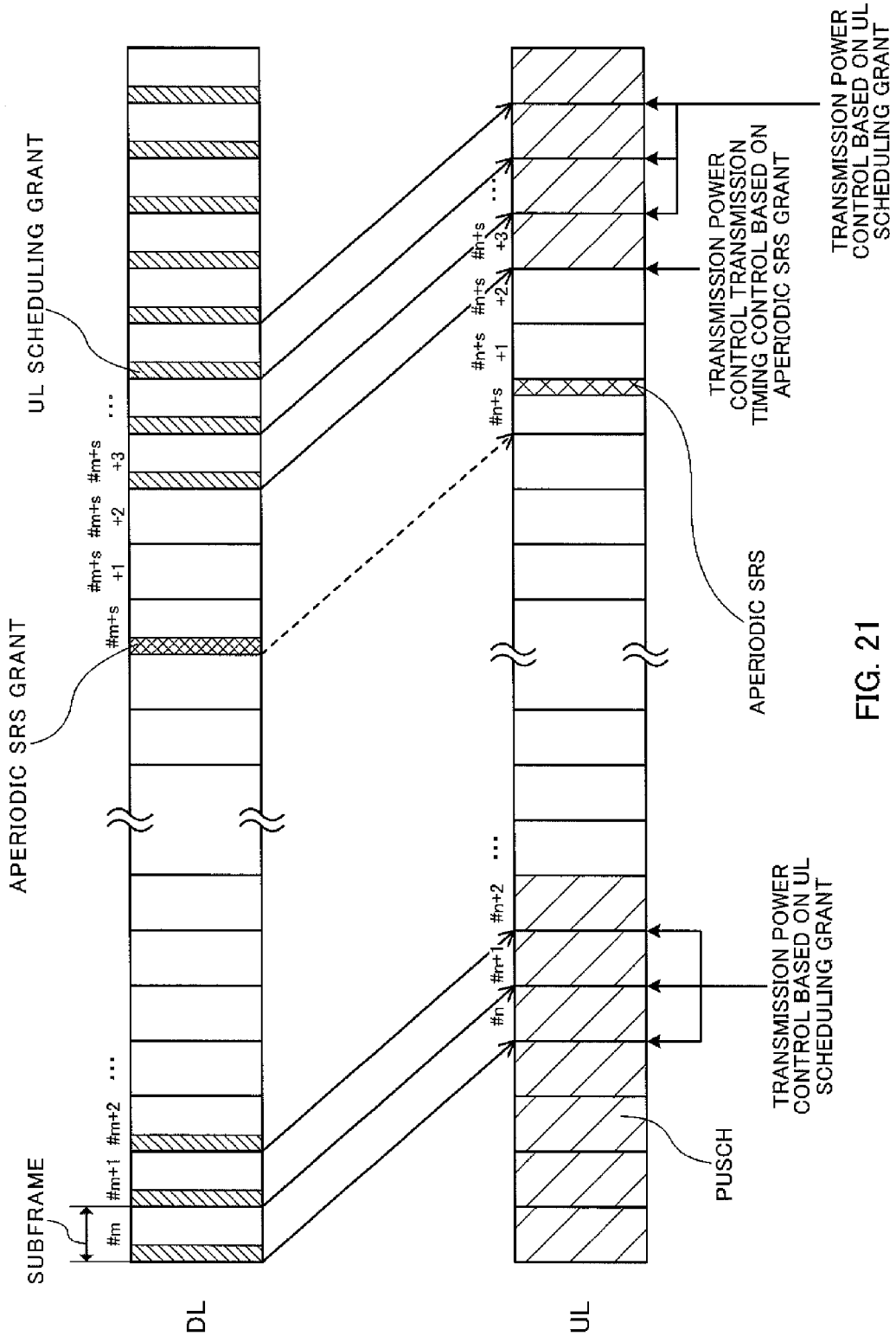
FIG. 21 is a diagram to explain an SRS transmitted in the reference signal transmission method according to the eleventh aspect of the invention.

As descried above, the scheduling grant for SRS is capable of including the transmission control information to control transmission of not only the SRS but also the data channel signal (PUSCH), in addition to resource information to transmit the SRS. According to such a scheduling grant for SRS, also when the mobile station apparatus UE resumes transmission of the data channel signal (PUSCH) after suspending, it is possible to suitably set transmission power and transmission timing of the data channel signal (PUSCH). Referring to FIG. 21, described specifically is transmission power control and transmission timing control of the data channel signal (PUSCH) using the scheduling grant for SRS in the mobile station apparatus UE.

FIG. 21 is a diagram to explain transmission power control and transmission timing control of the data channel signal (PUSCH) using the scheduling grant (also, referred to as an Aperiodic SRS grant) for SRS transmitted in the reference signal transmission method according to the eleventh aspect. As shown in FIG. 21, when there is a data channel signal (PUSCH) transmitted from the mobile station apparatus UE in uplink, the base station apparatus eNode B transmits an UL scheduling grant in downlink. The mobile station apparatus UE controls transmission power of the data channel signal (PUSCH) in uplink according to transmission power control (TPC) included in the UL scheduling grant. In FIG. 21, the UL scheduling grant is transmitted to the mobile station apparatus UE in subframes #m to #m+2 in downlink. According to the transmission power control (TPC) included in the UL scheduling grant, the mobile station apparatus UE controls transmission power of the data channel signal (PUSCH) transmitted in subframes #n to #n+2. Meanwhile, when transmission of the data channel signal (PUSCH) transmitted from the mobile station apparatus UE in uplink is suspended and then resumed, there is a case that transmission power and transmission timing of the data channel signal (PUSCH) is not suitably set.

Therefore, as shown in FIG. 21, when the mobile station apparatus UE resumes transmission of the data channel signal (PUSCH), the base station apparatus eNode B transmits the scheduling grant for SRS to the mobile station apparatus UE, in response to a Scheduling Request (not shown) received from the mobile station apparatus UE. According to the extended transmission control information (Extended TPC) and transmission timing information (TA) included in the scheduling grant for SRS, the mobile station apparatus UE controls transmission power and transmission timing of the data channel signal (PUSCH) in uplink. In FIG. 21, the scheduling grant for SRS is transmitted to the mobile station apparatus UE in a subframe #m+s in downlink. According to the extended transmission control information (Extended TPC) and transmission timing information (TA) included in the scheduling grant for SRS, the mobile station apparatus UE controls transmission power and transmission timing of the data channel signal (PUSCH) of which transmission is resumed in a subframe #n+s+3. Herein, the extended transmission control information (Extended TPC) and transmission timing information (TA) is set at suitable values by the SRS that is transmitted periodically or in response to instructions for transmission of SRS after suspending transmission of the data channel signal (PUSCH). Further, in the extended transmission control information (Extended TPC), the control range of transmission power is increased. Accordingly, as shown in FIG. 21, also when the mobile station apparatus UE resumes transmission of the data channel signal (PUSCH) after suspending, the mobile station apparatus UE is capable of suitably setting transmission power and transmission timing. In addition, since instructions for transmission of SRS are included in the scheduling grant for SRS transmitted in the subframe #m+s in downlink, the mobile station apparatus UE transmits the SRS in a subframe #n+s in uplink, An Embodiment of the invention will specifically be described below with reference to accompanying drawings. Described herein is the case of using the base station apparatus and mobile station apparatus that support an LTE-A-scheme system (LTE-A system).

Figure 12:
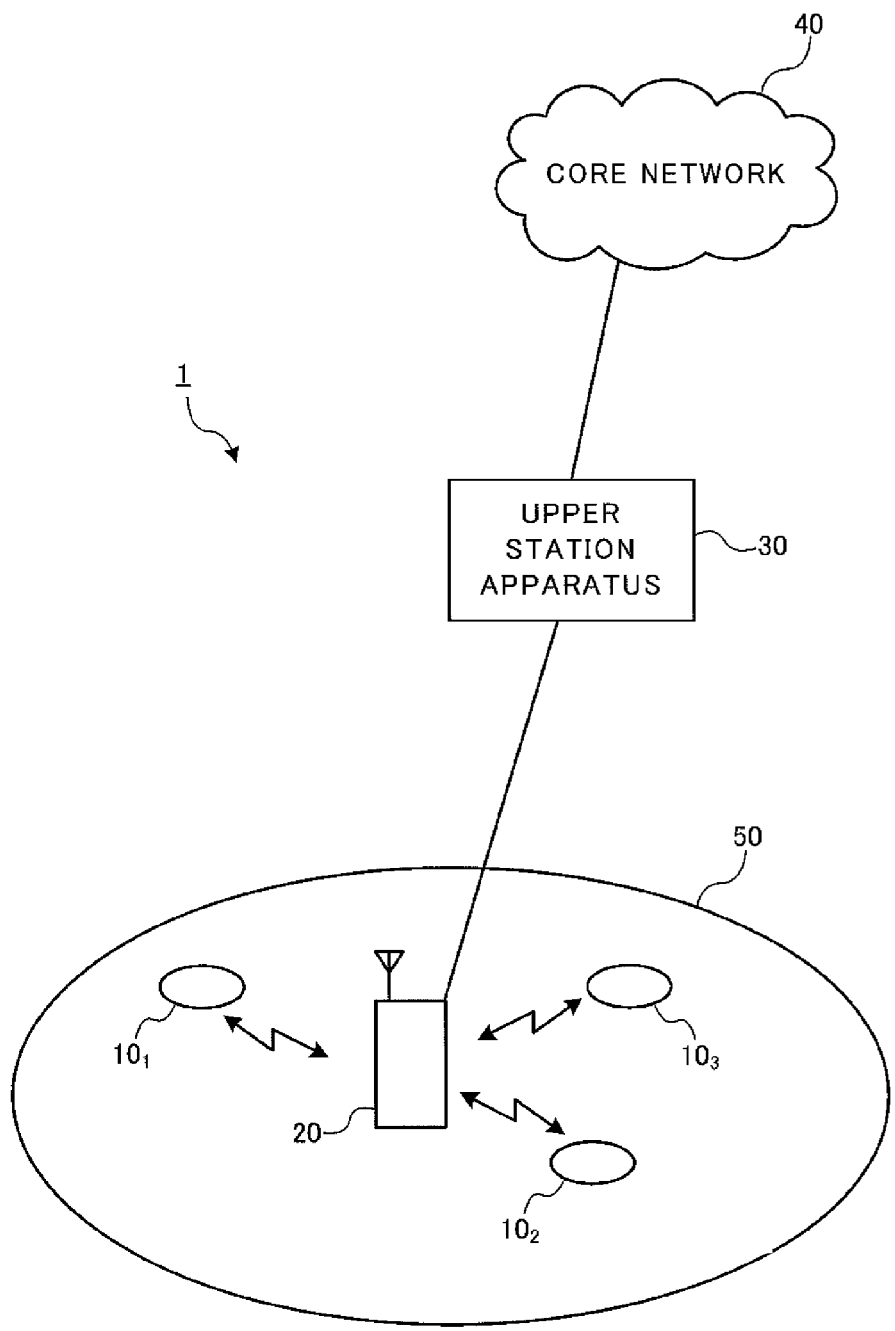
FIG. 12 is a diagram to explain a configuration of a mobile communication system according to one Embodiment of the invention.

Referring to FIG. 12, described is a mobile communication system 1 having mobile station apparatuses (UEs) 10 and base station apparatus (eNode B) 20 according to one Embodiment of the invention. FIG. 12 is a diagram to explain a configuration of the mobile communication system 1 having mobile station apparatuses 10 and base station apparatus 20 according to one Embodiment of the invention. In addition, the mobile communication system 1 as shown in FIG. 12 is a system including, for example, the LTE system or SUPER 3G. Further, the mobile communication system 1 may be called IMT-Advanced or may be called 4G.

As shown in FIG. 12, the mobile communication system 1 includes the base station apparatus 20 and a plurality of mobile station apparatuses 10 ($10_1$, $10_2$, $10_3$, ..., $10_n$, n is an integer where n>0) that communicate with the base station apparatus 20. The base station apparatus 20 is connected to an upper station apparatus 30, and the upper station apparatus 30 is connected to a core network 40. The mobile station apparatus 10 communicates with the base station apparatus 20 in a cell 50. In addition, for example, the upper station apparatus 30 includes an access gateway apparatus, radio network controller (RNC), mobility management entity (MME), etc., but is not limited thereto.

Each of the mobile station apparatuses 10 ($10_1$, $10_2$, $10_3$, ..., $10n$) has the same configuration, function and state, and is described as a mobile station apparatus 10 unless otherwise specified in the following description. Further, for convenience in description, the description is given while assuming that equipment that performs radio communication with the base station apparatus 20 is the mobile station apparatus 10, and more generally, the equipment may be user equipment (UE) including mobile station apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) or Clustered DFT-Spread OFDM is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals. Clustered DFT-Spread OFDM is a scheme for assigning a group (cluster) of noncontiguous clustered subcarriers to a single mobile station UE, applying DFT-Spread OFDM to each cluster, and thereby achieving multiple accesses in uplink.

Described herein are communication channels in the LTE system. In downlink, used are the PDSCH shared among the mobile station apparatuses 10, and downlink L1/L2 control channels (PDCCH, PCFICH and PHICH). On the PDSCH, user data i.e. normal data signals are transmitted. The transmission data is included in the user data. In addition, the UL scheduling grant including the transmission identification bit as described above is notified to the mobile station apparatus 10 on the L1/L2 control channel (PDCCH).

In uplink, used are the PUSCH shared among the mobile station apparatuses 10, and the PUCCH that is a control channel in uplink. User data is transmitted on the PUSCH. Meanwhile, on the PUCCH is transmitted radio quality information (CQI: Channel Quality Indicator) in downlink, etc.

Figure 13:
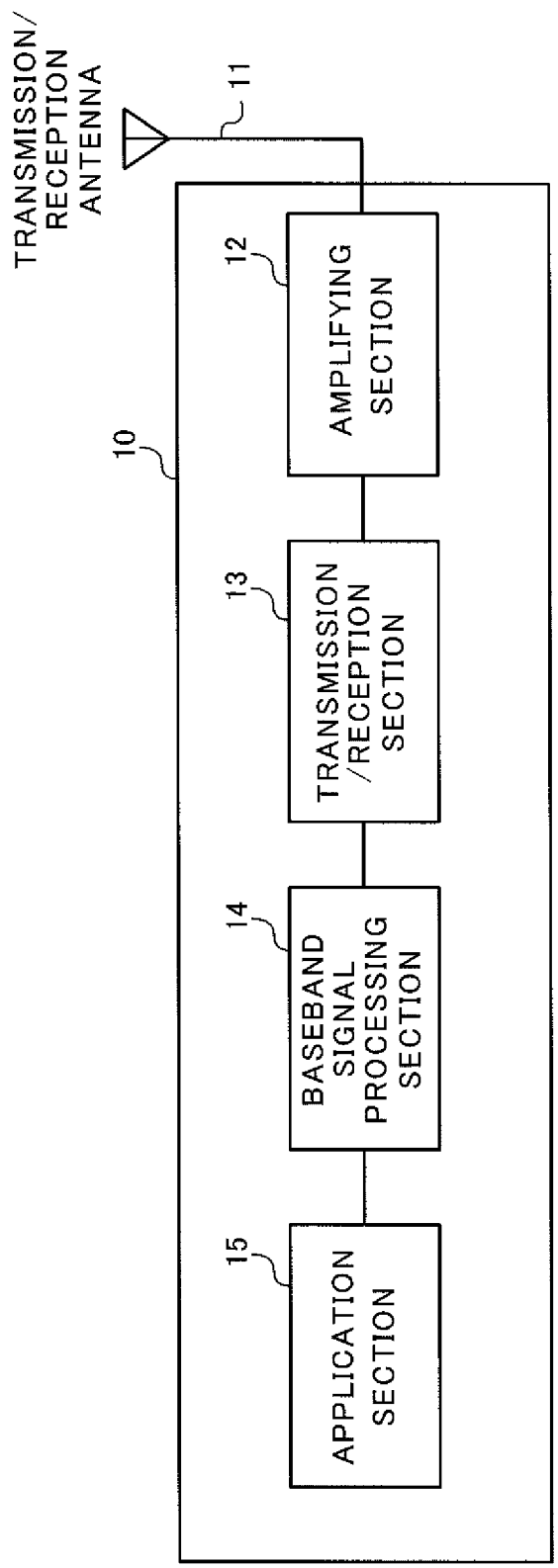
FIG. 13 is a block diagram to illustrating an entire configuration of a mobile station apparatus according to the Embodiment.

Referring to FIG. 13, described is the entire configuration of the mobile station apparatus 10 according to this Embodiment. The LTE terminal and the LTE-A terminal have the same configuration of principle part of hardware, and are not distinguished in the description. The mobile station apparatus 10 is provided with a transmission/reception antenna 11, amplifying section 12, transmission/reception section 13, baseband signal processing section 14, and application section 15. The reception section is comprised of the transmission/reception antenna 11, the amplifying section 12, the transmission/reception section 13, and a part of the baseband signal processing section 14.

With respect to data in downlink, a radio frequency signal received in the transmission/reception antenna 11 is amplified in the amplifying section 12, subjected to frequency conversion in the transmission/reception section 13, and is converted into a baseband signal. The baseband signal is subjected to FFT processing, error correcting decoding, reception processing of retransmission control, etc. in the baseband signal processing section 14. Among the data in downlink, user data in downlink is transferred to the application section 15. The application section 15 performs processing concerning layers higher than the physical layer and MAC layer and the like. Further, among the data in downlink, broadcast information is also transferred to the application section 15.

Meanwhile, the application section 15 inputs user data in uplink to the baseband signal processing section 14. The baseband signal processing section 14 performs transmission processing of retransmission control (H-ARQ (Hybrid ARQ)), channel coding, DFT processing, IFFT processing, etc. on the data to transfer to the transmission/reception section 13. The transmission/reception section 13 performs frequency conversion processing for converting the baseband signal output from the baseband signal processing section 14 into a signal with a radio frequency band, and then, the signal is amplified in the amplifying section 12, and is transmitted from the transmission/reception antenna 11.

Figure 14:
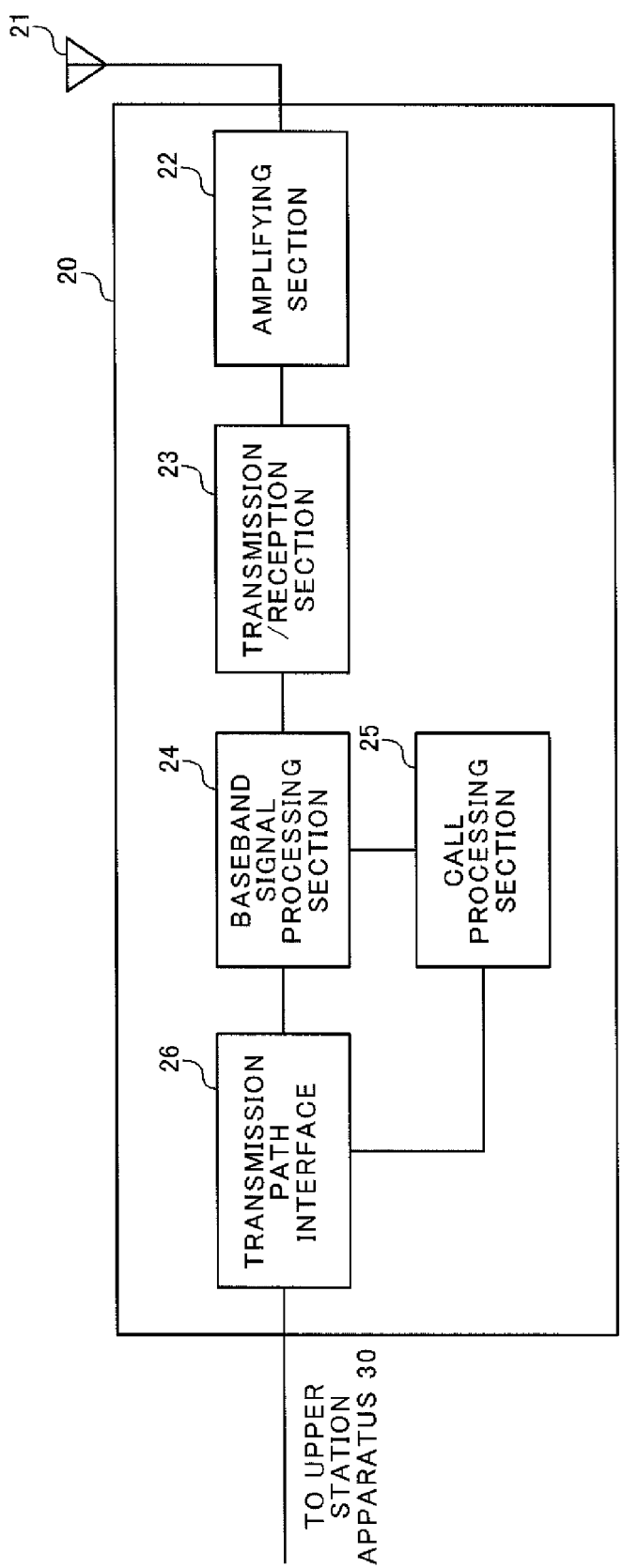
FIG. 14 is a block diagram to illustrating an entire configuration of a base station apparatus according to the Embodiment.

Referring to FIG. 14, described next is the entire configuration of the base station apparatus 20 according to this Embodiment. The base station apparatus 20 is provided with a transmission/reception antenna 21, amplifying section 22, transmission/reception section 23, baseband signal processing section 24, call processing section 25, and transmission path interface 26. The transmission section is comprised of the transmission/reception antenna 21, the amplifying section 22, the transmission/reception section 23, and a part of the baseband signal processing section 24.

The user data transmitted from the base station apparatus 20 to the mobile station apparatus 10 in downlink is input to the baseband signal processing section 24 via the transmission path interface 26 from the upper station apparatus 30 positioned higher than the base station apparatus 20.

The baseband signal processing section 24 performs PDCP layer processing, segmentation and concatenation of user data, RLC (Radio Link Control) layer transmission processing such as transmission processing of PLC retransmission control, MAC (Medium Access Control) retransmission control e.g. transmission processing of HARQ (Hybrid Automatic Repeat reQuest), scheduling, transmission format selection, channel coding, Inverse Fast Fourier Transform (IFFT) processing and precoding processing on the data. Further, with respect to signals of the Physical Downlink Control Channel that is a downlink control channel, the transmission processing such as channel coding and Inverse Fast Fourier Transform is performed, and the resultant is transferred to the transmission/reception section 23.

The transmission/reception section 23 performs frequency conversion processing for converting the baseband signal output from the baseband signal processing section 24 into a signal with a radio frequency band, and then, the signal is amplified in the amplifying section 22 and transmitted from the transmission/reception antenna 21.

Meanwhile, with respect to signals transmitted from the mobile station apparatus 10 to the base station apparatus 20 in uplink, a radio frequency signal received in the transmission/reception antenna 21 is amplified in the amplifying section 22. Then, the signal is subjected to frequency conversion in the transmission/reception section 23, thereby converted into a baseband signal, and is input to the baseband signal processing section 24.

The baseband signal processing section 24 performs FFT processing, IDFT processing, error correcting decoding, reception processing of MAC retransmission control, and reception processing of RLC layer and PDCP layer on the user data included in the input baseband signal, and transfers the resultant to the upper station apparatus 30 via the transmission path interface 26.

The call processing section 25 performs call processing such as setting and release of the communication channel, status management of the base station apparatus 20, and management of radio resources.

Figure 15:
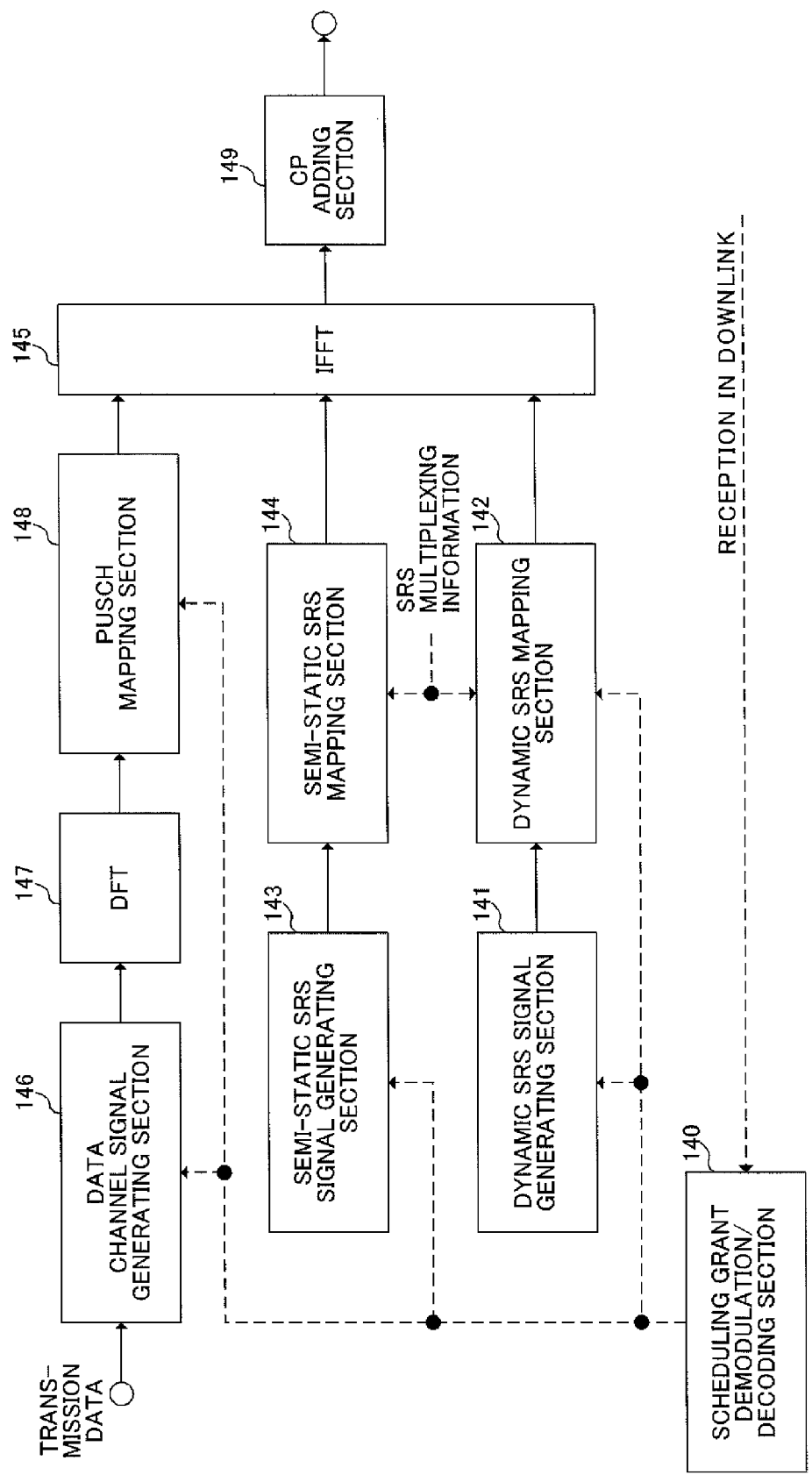
FIG. 15 is a functional block diagram of a baseband signal processing section that the mobile station apparatus according to the Embodiment has.

FIG. 15 is a functional block diagram of the baseband signal processing section 14 that the mobile station apparatus 10 has according to this Embodiment. In addition, for convenience in description, in the baseband signal processing section 14 as shown in FIG. 15, the configuration related to the reference signal transmission methods according to the invention is only shown, but it is assumed that the section 14 is provided with the configuration provided in a normal baseband processing section. Further, in the following description, it is assumed that "Dynamic SRS" refers to an SRS of which transmission timing is controlled dynamically by the reference signal transmission method according to the invention, and that "Semi-static SRS" refers to an SRS (i.e. SRS in the LTE system) which is periodically transmitted without being dynamically controlled.

An uplink scheduling grant transmitted from the base station apparatus 20 in downlink is input to a scheduling grant demodulation/decoding section 140, and is demodulated and decoded. Then, the demodulation/decoding result of the uplink scheduling grant is output to a data channel signal generating section 146 and PUSCH mapping section 148, described later. In addition, the UL scheduling grant includes assignment information of uplink resource block, ID of the mobile station apparatus 10, data size, modulation scheme, uplink transmission power information, and information of DMRS. In the reference signal transmission method according to the fourth aspect of the invention, the UL scheduling grant of the format configuration as shown in FIG. 6A or 6B is decoded. At this point, an interpretation of a part of control bits is switched, based on whether instructions for transmission of SRS are "0" (OFF) or "1" (ON). When instructions for transmission of SRS are "0" (OFF), the control bits are identified in the same interpretation as in LTE. Meanwhile, when instructions for transmission of SRS are "1" (ON), control bits indicative of a shift amount of DMRS in LTE are interpreted as control bits indicative of a shift amount (cyclic Shift: 3 bits) of SRS.

As a result of demodulation and decoding of the UL scheduling grant, when the UL scheduling grant includes instructions for transmission of Dynamic SRS, the result is notified to a Dynamic SRS signal generating section 141. In addition, the presence or absence of instructions for transmission of Dynamic SRS is determined by the presence or absence of the above-mentioned transmission identification bit. Further, when the UL scheduling grant includes SRS multiplexing information, the SRS multiplexing information is output to a Dynamic SRS mapping section 142. In addition, when the SRS multiplexing information is notified by PRC signaling, the SRS multiplexing information is also output to the Dynamic SRS mapping section 142. In the reference signal transmission method according to the fourth aspect of the invention, information of SRS-transmittable subframe is beforehand subjected to RRC signaling, and is provided to the Dynamic SRS mapping section 142.

Meanwhile, in the case of receiving an UL scheduling grant without including instructions for transmission of Dynamic SAS i.e. an UL scheduling grant in the LTE system, the result is notified to a Semi-static SRS signal generating section 143. Further, when the SRS multiplexing information is notified by RRC signaling, the SRS multiplexing information is output to the Semi-static SRS mapping section 144.

The Dynamic SRS signal generating section 141 generates the Dynamic SRS in response to instructions for transmission included in the UL scheduling grant. The Dynamic SRS mapping section 142 maps the Dynamic SRS generated in the Dynamic SRS signal generating section 141 to radio resources, based on the SRS multiplexing information notified by the UL scheduling grant, or SRS multiplexing information notified by RRC signaling. The Dynamic SRS mapping section 142 constitutes the multiplexing section. The Dynamic SRS is multiplexed into a predetermined symbol by being mapped to radio resources by the Dynamic SRS mapping section 142. Then, the Dynamic SRS mapped to the radio resources is output to an Inverse Fast Fourier Transform section (IFFT) 145.

For example, when the Dynamic SRS is generated according to the reference signal transmission method according to the first aspect, the Dynamic SRS is multiplexed into the last symbol of the same subframe as the PUSCH that the UL scheduling grant including instructions for transmission instructs to transmit. Further, when the Dynamic SRS is generated according to the reference signal transmission method according to the second aspect, the Dynamic SRS is multiplexed into the last symbol of a subframe immediately before the subframe of the PUSCH that the UL scheduling grant including instructions for transmission instructs to transmit. Furthermore, when the Dynamic SRS is generated according to the reference signal transmission method according to the third aspect, the Dynamic SRS is multiplexed into the last symbol of a previous subframe by the predetermined number of subframes before the subframe of the PUSCH that the UL scheduling grant including instructions for transmission instructs to transmit. Still furthermore, when the Dynamic SRS is generated according to the reference signal transmission method according to the fourth aspect, with reference to a previous for later) subframe by the predetermined number of subframes before (or after) the subframe of the PUSCH that the UL scheduling grant including instructions for transmission instructs to transmit, the Dynamic SRS is multiplexed into the last symbol of the first SRS-transmittable subframe from the reference subframe. SRS-transmittable subframes are beforehand subjected to RRC signaling.

Further, when the Dynamic SRS is generated according to the reference signal transmission method according to the fifth aspect, the Dynamic SRS is multiplexed by overlapping with the DMRS of the corresponding subframe. Furthermore, when the Dynamic SRS is generated according to the reference signal transmission method according to the sixth aspect, the Dynamic SRS is multiplexed by overlapping with the PUSCH of the corresponding subframe. Still furthermore, when the Dynamic SRS is generated according to the reference signal transmission method according to the seventh aspect, the Dynamic SRS is multiplexed by overlapping with the PUSCH and DMRS of the corresponding subframe. Moreover, when the Dynamic SRS is generated according to the reference signal transmission method according to the eighth aspect, the Dynamic SRS is multiplexed into a resource block different from the resource block assigned to the mobile station apparatus 10 in the corresponding subframe. Further, when the Dynamic SRS is generated according to the reference signal transmission method according to the ninth aspect, the Dynamic SRS is multiplexed into a beginning symbol of the PUSCH in the corresponding subframe. Furthermore, when the Dynamic SRS is generated according to the reference signal transmission method according to the tenth aspect, the Dynamic SRS is multiplexed by overlapping with a beginning symbol of the PUSCH in the corresponding subframe.

The Semi-static SRS signal generating section 143 generates a Semi-static SRS in response to the UL scheduling grant. The Semi-static SRS mapping section 144 maps the Semi-static SRS based on the SRS multiplexing information notified by RRC signaling. In this case, the Semi-static SRS is mapped to a last symbol of a later subframe by 4 subframes after receiving notification of the UL scheduling grant. Then, the Semi-static SRS mapped to radio resources is output to the Inverse Fast Fourier Transform section (IFFT) 145.

Meanwhile, transmission data indicated from the higher layer is input to the data channel signal generating section 146. The data channel signal generating section 146 generates a data channel signal (PUSCH) in uplink based on information included in the uplink scheduling grant. The data channel signal is subjected to channel coding in a channel coding/modulation section, not shown, and is output to a Discrete Fourier Transform section (DFT) 147. Then, the signal is subjected to discrete Fourier transform in the DFT section 147, thereby transformed into the signal in the frequency domain from the time-series signal, and is output to the PUSCH mapping section 148.

The PUSCH mapping section 148 performs mapping on the data channel signal (PUSCH) based on the resource block assignment information included in the uplink scheduling grant. Then, the mapped data channel signal (PUSCH) is output to the Inverse Fast Fourier Transform section (IFFT) 145.

In the IFFT section 145, with respect to the data channel signal from the PUSCH mapping section 148, and the Semi-static SRS from the Semi-static SRS mapping section 144 or the Dynamic SRS from the Dynamic SRS mapping section 142, the signals are subjected to inverse fast Fourier transform, thereby transformed into the time-series signal from the signals in the frequency domain, and are output to a cyclic prefix adding section 149. The cyclic prefix adding section 149 adds a cyclic prefix to the time-series transmission signal. The transmission signal provided with the cyclic prefix is output to the transmission/reception section 13. The transmission signal input to the transmission/reception section 13 is transmitted to the base station apparatus 20 in uplink via the amplifying section 12 and transmission/reception antenna 11.

Thus, in the mobile station apparatus 10 according to this Embodiment, since the Dynamic SRS is multiplexed into a particular subframe in response to an UL scheduling grant including instructions for transmission of Dynamic SRS, it is possible to dynamically control a subframe to multiplex the Dynamic SRS, and therefore, as compared with the case of multiplexing the SRS periodically irrespective of the presence or absence of the PUSCH, it is possible to efficiently use radio resources used in transmission of Dynamic SRS.

Figure 16:
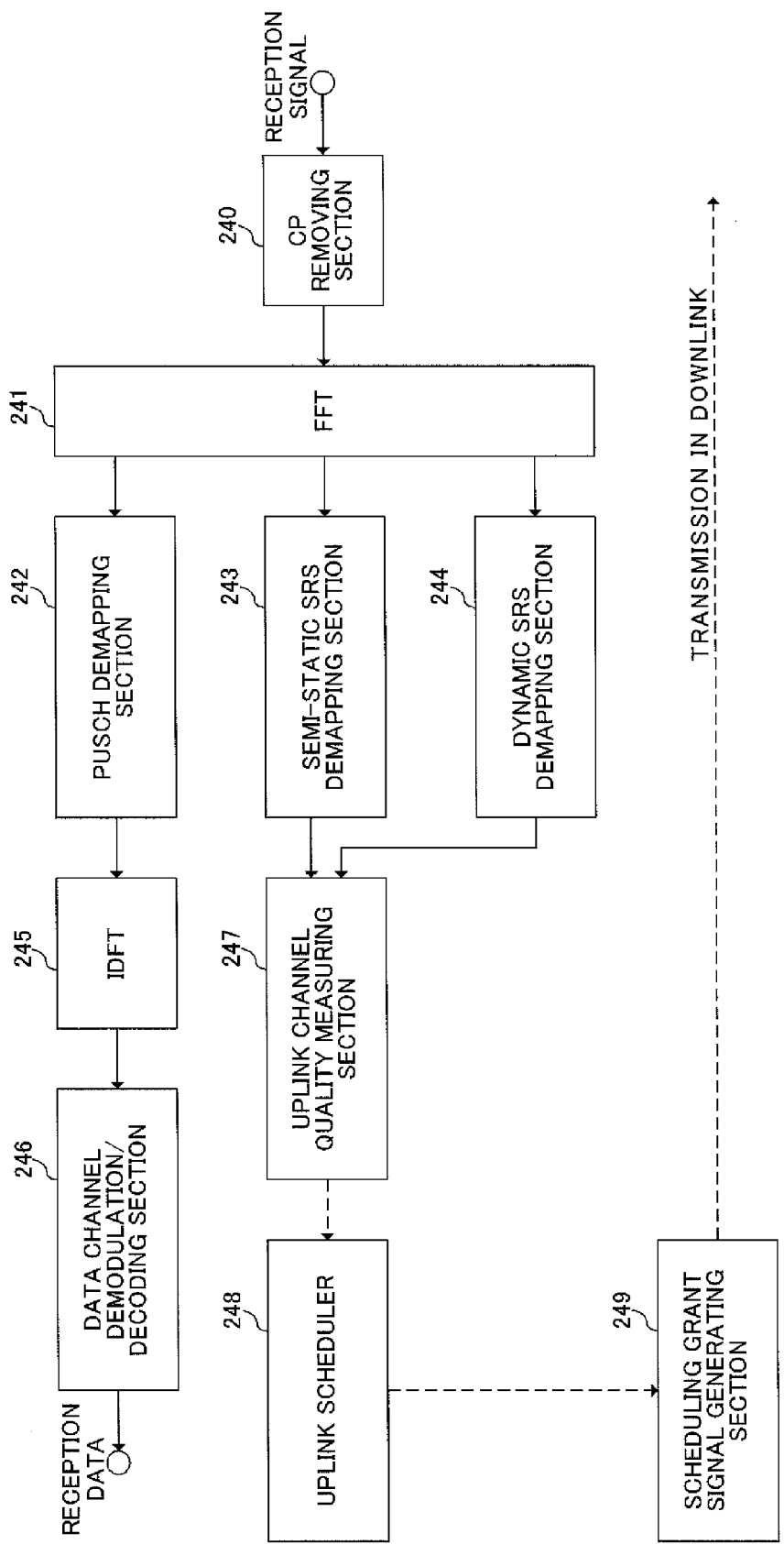
FIG. 16 is a functional block diagram of a baseband signal processing section that the base station apparatus according to the Embodiment has.

FIG. 16 is a functional block diagram of the baseband signal processing section 24 that the base station apparatus 20 has according to this Embodiment. In addition, for convenience in description, in the baseband signal processing section 24 as shown in FIG. 16, the conf figuration related to the reference signal transmission methods according to the invention is only shown, but it is assumed that the section 24 is provided with the configuration provided in a normal baseband processing section.

In a reception signal input to the baseband signal processing section 24, a cyclic prefix added to the reception signal is removed in a CP removing section 240, and the signal is subjected to Fourier transform in a Fast Fourier Transform section (FFT) 241, and is transformed into the signal in the frequency domain. Among the reception signals transformed into the signals in the frequency domain, the reception signal concerning the PUSCH is output to a PUSCH demapping section 242, and is demapped in the frequency domain in the PUSCH demapping section 242.

The reception signal demapped in the PUSCH demapping section 242 is output to an Inverse Discrete Fourier Transform section (IDFT) 245. The Inverse Discrete Fourier Transform section (IDFT) 245 performs inverse discrete Fourier transform processing on the reception signal, and restores the signal in the frequency domain to the signal in the time domain. Then, the reception signal that is the signal in the time domain is demodulated and decoded in a data channel demodulation/decoding section 246, based on the transmission format (coding rate, modulation scheme), and the reception data is reproduced.

Meanwhile, among the reception signals transformed in the information in the frequency domain in the Fast Fourier Transform section 241, the reception signal concerning the Semi-static SRS is output to a Semi-static SRS demapping section 243, and the reception signal concerning the Dynamic SRS is output to a Dynamic SRS demapping section 244. In this case, the reception signal concerning the Semi-static SRS is received when the mobile station apparatus 10 is an LTE terminal. Meanwhile, the reception signal concerning the Dynamic SRS is received when the mobile station apparatus 10 is an LTE-A terminal to which is applied the reference signal transmission method according to the invention.

The reception signal concerning the Semi-static SRS is demapped in the frequency domain in the Semi-static SRS demapping section 243, and is output to an uplink channel quality measuring section 247. Similarly, the reception signal concerning the Dynamic SRS is demapped in the frequency domain in the Dynamic SRS demapping section 244. In the reference signal transmission method according to the fourth aspect of the invention, the SRS-transmittable subframe information is provided to the Dynamic SRS demapping section 244, and the SRS which has been multiplexed into the SRS-transmittable subframe is demapped. The demapped SRS is output to the uplink channel quality measuring section 247. The uplink channel quality measuring section 247 measures the uplink channel quality based on the reception signal concerning the Semi-static SRS or Dynamic SRS demapped in the frequency domain.

The measured channel quality information is output to an uplink scheduler 248. The uplink scheduler 248 performs scheduling for the mobile station apparatus 10 to transmit a PUSCH, based on the channel quality information. The scheduling information determined in the uplink scheduler 248 is output to a scheduling grant signal generating section 249.

For example, when the Dynamic SRS is transmitted from the mobile station apparatus 10 according to the reference signal transmission method according to the first or second aspect, the uplink channel quality measuring section 247 measures the channel quality based on the Dynamic SRS multiplexed successively (subsequent/prior to) the PUSCH, and based on the measurement result, the uplink scheduler 248 performs scheduling. Therefore, it is possible to measure the channel quality at timing at which the PUSCH is actually transmitted, and it is thereby possible to perform scheduling while reflecting the actual channel state.

Further, when the Dynamic SRS is transmitted from the mobile station apparatus 10 according to the reference signal transmission method according to the third aspect, the uplink channel quality measuring section 247 measures the channel quality based on the Dynamic SRS multiplexed prior to the PUSCH, and based on the measurement result, the uplink scheduler 248 performs scheduling. Therefore, it is possible to measure the channel quality at timing approximating timing at which the PUSCH is actually transmitted, while reflecting the content of scheduling in a subsequent UL scheduling grant including instructions for transmission. Moreover, when the Dynamic SRS is transmitted from the mobile station apparatus 10 according to the reference signal transmission method according to the fourth aspect, since the SRS is transmitted only in a beforehand limited subframe that does not collide with the broadcast information, RRC control information and the like, it is possible to reliably prevent the SRS from colliding with the broadcast information, RRC control information and the like.

Furthermore, when the Dynamic SRS is transmitted from the mobile station apparatus 10 according to the reference signal transmission method according to the fifth to eighth aspects, the uplink channel quality measuring section 247 measures the channel quality based on the Dynamic SRS multiplexed into a plurality of symbols, and based on the measurement result, the uplink scheduler 248 performs scheduling. Therefore, as compared with the case of multiplexing the SRS only into the last symbol, the base station apparatus 20 is capable of properly receiving the Dynamic SRS, and is capable of suitably performing scheduling based on the Dynamic SRS.

Still furthermore, when the Dynamic SRS is transmitted from the mobile station apparatus 10 according to the reference signal transmission method according to the ninth or tenth aspect, the uplink channel quality measuring section 247 measures the channel quality based on the Dynamic SRS multiplexed into a symbol in which demodulation accuracy may deteriorate when a data channel signal is transmitted, and based on the measurement result, the uplink scheduler 248 performs scheduling. Therefore, it is possible to efficiently use radio resources while suppressing deterioration of demodulation accuracy of the data channel signal. Particularly, when the Dynamic SRS is transmitted from the mobile station apparatus 10 according to the reference signal transmission method according to the tenth aspect, since it is possible to measure the channel quality based on the SRS multiplexed into the resource block ($N_{RB}''$) with a wide band including the resource block ($N_{RB}$) assigned to the mobile station apparatus 10, it is possible to improve measurement accuracy of the channel quality.

The scheduling grant signal generating section 249 constitutes the generation section, and based on the scheduling information input from the uplink scheduler 248, generates an UL scheduling grant signal including instructions (transmission identification bit) for transmission of Dynamic SRS. Meanwhile, when the mobile station apparatus 10 is a terminal that supports the LTE system, the scheduling grant signal generating section 249 generates an UL scheduling grant signal that does not include instructions (transmission identification bit) for transmission of Dynamic SRS. Further, the scheduling grant signal generating section 249 is capable of including a part of the SRS multiplexing information in the UL scheduling grant signal. In the reference signal transmission method according to the fourth aspect of the invention, the section 249 generates an UL scheduling grant indicated by the format as shown in FIG. 6A or 6B. The UL scheduling grant signal generated in the scheduling grant signal generating section 249 is transmitted to the mobile station apparatus 10 in downlink via the transmission/reception section 23, amplifying section 22 and transmission/reception antenna 21. In addition, the transmission section is comprised of the transmission/reception section 23, amplifying section 22 and transmission/reception antenna 21.

Thus, in the base station apparatus 20 according to this Embodiment, since an UL scheduling grant including instructions for transmission of Dynamic SRS is transmitted to the mobile station apparatus 10, it is possible to provide instructions for transmission of Dynamic SRS by the UL scheduling grant, it is thereby possible to dynamically control a subframe to multiplex the Dynamic SRS, and it is thus possible to efficiently use radio resources used in transmission of SRS.

Further, the base station apparatus measures the channel quality based on the Dynamic SRS multiplexed into a particular subframe in response to the UL scheduling grant including instructions for transmission, performs scheduling for PUSCH transmission in the mobile station apparatus 10, is thereby capable of measuring the channel quality at timing at which the PUSCH is actually transmitted or at timing close to the timing, and is thus capable of performing scheduling while reflecting the actual channel state.

Furthermore, when the Dynamic SRS is multiplexed into a plurality of symbols in a particular subframe, as compared with the case of multiplexing the SRS only into the last symbol, the base station apparatus 20 is capable of properly receiving the Dynamic SRS, and is capable of performing scheduling of high accuracy associated with the channel quality based on the Dynamic SRS.

A modification of the Embodiment of the invention will be described next focusing on the difference from the aforementioned Embodiment. This modification is related to transmission power control and transmission timing control of the data channel signal (PUSCH) using the scheduling grant for SRS transmitted in the reference signal transmission method according to the eleventh aspect. In addition, in this modification, it is assumed that "Aperiodic SRS" refers to an SRS of which transmission timing is controlled dynamically, and that "Periodic SRS" refers to an SRS which is periodically transmitted without being dynamically controlled. The "Aperiodic SRS" may be the same as the "Dynamic SRS" of the above-mentioned Embodiment, and the "Periodic SRS" may be the same as the "Semi-static SRS" of the above-mentioned Embodiment. Further, in this modification, it is assumed that "Aperiodic SRS grant" refers to a scheduling grant for SRS that is transmitted in the reference signal transmission method according to the eleventh aspect.

Figure 22:
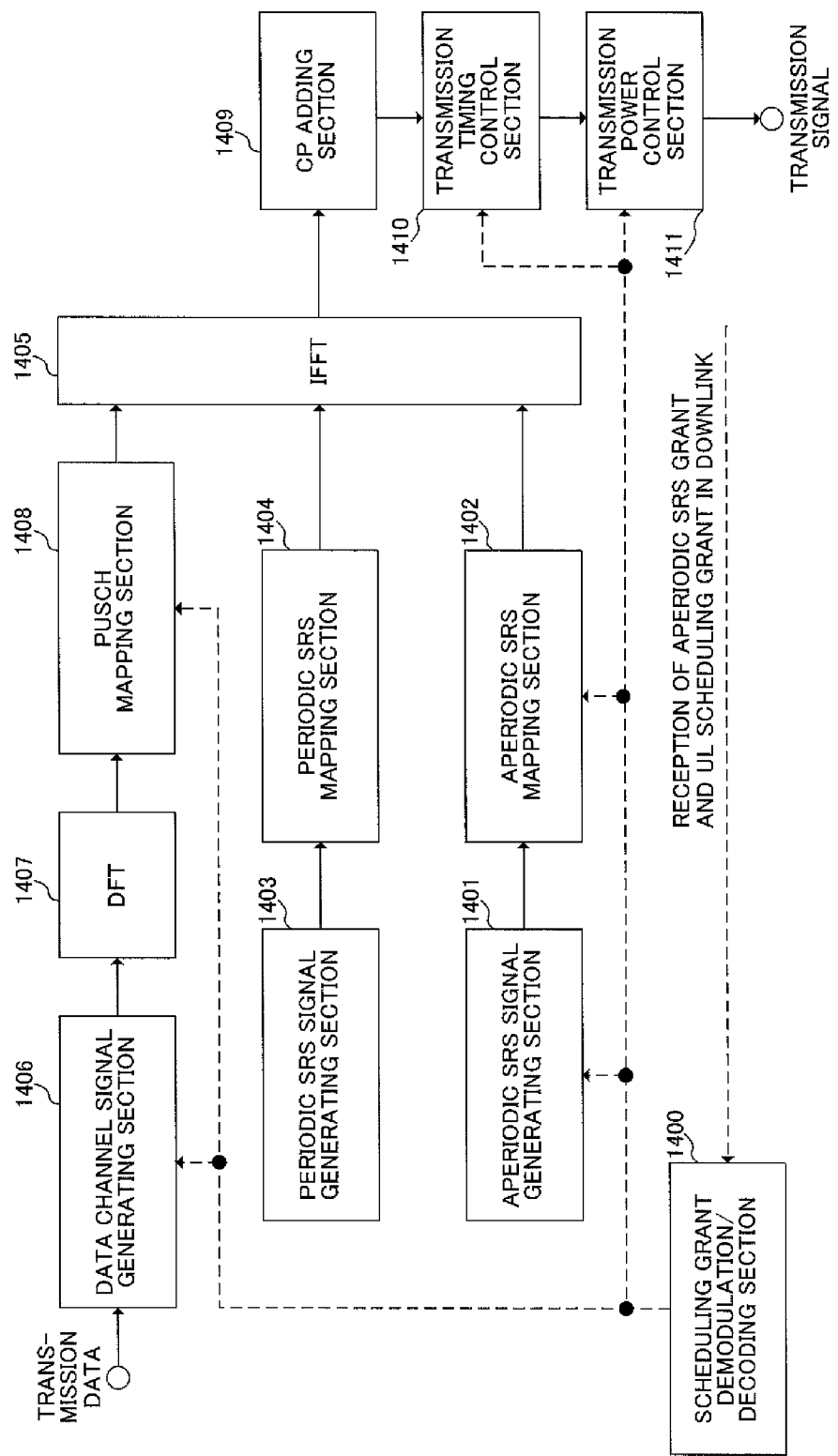
FIG. 22 is a functional block diagram of a baseband signal processing section that a mobile station apparatus according to a modification of the invention has.

FIG. 22 is a functional block diagram of the baseband signal processing section 14 that the mobile station apparatus 10 has according to the modification. In addition, for convenience in description, in the baseband signal processing section 14 as shown in FIG. 22, the configuration related to the reference signal transmission method according to the eleventh aspect of the invention is only shown, but it is assumed that the section 14 is provided with the configuration provided in a normal baseband processing section.

As shown in FIG. 22, a scheduling grant demodulation/decoding section 1400 demodulates and decodes a scheduling grant transmitted from the base station apparatus 20. More specifically, the scheduling grant demodulation/decoding section 1400 switches the interpretation method of the scheduling grant based on whether or not the demodulated scheduling grant includes instructions for transmission of Aperiodic SRS.

For example, when the scheduling grant that is demodulated and decoded does not include instructions for transmission of Aperiodic SRS (i.e. "Aperiodic SRS request" is set for "0" as shown in FIG. 19A) and the DCI format indicated in a first bit is "0", the scheduling grant demodulation/decoding section 1400 interprets the scheduling grant as the UL scheduling grant shown in FIG. 19A, and acquires radio resource allocation information (Resource block assignment and hopping resource allocation), modulation/coding scheme information (MCS and RV), retransmission information (NDI), transmission power control information (TPC), etc. The scheduling grant demodulation/decoding section 1400 inputs the acquired modulation/coding scheme information (MCS and RV) and retransmission information (NDI) to a data channel signal generating section 1406, inputs the radio resource allocation information (Resource block assignment and hopping resource allocation) to a PUSCH mapping section 1408, and inputs the transmission power control information (TPC) to a transmission power control section 1411.

Meanwhile, when the scheduling grant that is demodulated and decoded includes instructions for transmission of Aperiodic SRS (i.e. "Aperiodic SRS request" is set for "1" as shown in FIG. 19B), the scheduling grant demodulation/decoding section 1400 interprets the scheduling grant as an Aperiodic SRS grant shown in FIG. 19B, and acquires the transmission bandwidth (TxBW), frequency position, position information of the subframe (Comb), cyclic shift amount (CS), extended transmission power control information (Extended TPC), transmission timing control information (TA), etc. The scheduling grant demodulation/decoding section 1400 outputs the cyclic shift amount (CS) to an Aperiodic SRS signal generating section 1401, outputs the transmission bandwidth (TxBW), frequency position, position information of the subframe (Comb) and the like to an Aperiodic SRS mapping section 1402, outputs the transmission timing control information (TA) to a transmission timing control section 1410, and outputs the extended transmission power control information (Extended TPC) to a transmission power control section 1411.

When the cyclic shift amount (CS) and the like included in the Aperiodic SRS grant is input from the scheduling grant demodulation/decoding section 1400, the Aperiodic SRS signal generating section 1401 generates the Aperiodic SRS.

The Aperiodic SRS mapping section 1402 maps the Aperiodic SRS generated in the Aperiodic SRS signal generating section 1401 to radio resources, according to the information included in the Aperiodic SRS grant input from the scheduling grant demodulation/decoding section 1400. The Aperiodic SRS mapping section 1402 outputs the Aperiodic SRS mapped to radio resources to an Inverse Fast Fourier Transform (IFFT) section 1405.

A periodic SRS signal generating section 1403 generates the Periodic SRS at predetermined intervals. A Periodic SRS mapping section 1404 maps the Periodic SRS generated in the Periodic SRS signal generating section 1403 to radio resources. The Periodic SRS mapping section 1404 outputs the Periodic SRS mapped to radio resources to the IFFT section 1405.

The data channel siyual generating section 1406 generates the uplink data channel signal (PUSCH) to transmit transmission data input from the higher layer, based on the information included in the UL scheduling grant input from the scheduling grant demodulation/decoding section 1400, and outputs the generated data channel signal to a Discrete Fourier Transform (DCT) section 1407.

The DCT section 1407 performs discrete Fourier transform processing on the data channel signal (PUSCH) input from the data channel signal generating section 1406. The DFT section 1407 outputs the data channel signal in the frequency domain transformed from the time domain to the PUSCH mapping section 1408.

The PUSCH mapping section 1408 maps the data channel signal input from the DFT section 1407 to radio resources indicated by the UL scheduling grant input from the scheduling grant demodulation/decoding section 1400. The PUSCH mapping section 1408 outputs the data channel signal mapped to radio resources to the IFFT section 1405.

With respect to the data channel signal input from the PUSCH mapping section 1408, the Periodic SRS input from the Periodic SRS mapping section 1404, and the Aperiodic SRS input from the Aperiodic SRS mapping section 1402, the IFFT section 1405 performs the inverse fast Fourier transform processing on the signal. The IFFT section 1405 outputs the data channel signal (PUSCH), Periodic SRS or Aperiodic SRS in the time domain transformed from the frequency domain to a CP (Cyclic Prefix) adding section 1409 as a transmission signal.

The CP adding section 1409 adds a cyclic prefix to the transmission signal in the time domain input from the IFFT section 1405 to output to the transmission timing control section 1410.

The transmission timing control section 1410 controls transmission timing of the transmission signal output from the CP adding section 1409, according to the transmission timing control information (TA). Herein, the transmission timing control information (TA) is information indicative of transmission timing of the transmission signal, and is included in an RACH Response transmitted from the base station apparatus 20 at the time of initial access of the mobile station apparatus 10. Further, the transmission timing control information (TA) is also included in the Aperiodic SRS grant that is transmitted from the base station apparatus 20 at inconstant intervals. When the transmission timing control information (TA) included in the Aperiodic SRS grant is input from the scheduling grant demodulation/decoding section 1400, the transmission timing control section 1410 controls transmission timing of the transmission signal, according to the transmission timing control information (TA) included in the Aperiodic SRS grant.

The transmission power control section 1411 controls transmission power of the transmission signal, according to the transmission power control information (TPC) or extended transmission power control information (Extended TPC). Herein, as described previously, the transmission power control information (TPC) is the information of 2 bits included in the UL scheduling grant, and is to increase or decrease transmission power in 4 levels. Meanwhile, as described previously, the extended transmission power control information (Extended TPC) is the information of 4 bits included in the Aperiodic SRS grant, and is to increase or decrease transmission power in 16 levels.

More specifically, the transmission power control section 1411 controls transmission power of the transmission signal at timing i according to the following equation.

$$P_{PUSCH}(i) = \min\{P_{CMAX}, 10\log_{10}(M_{PUSCH}(i)) + P_{0\_PUSCH}(j) + \alpha \cdot PL + \Delta_{TF}(i) + f(i)\}$$

Herein, $P_{CMAX}$ is maximum transmission power, $M_{PUSCH}(i)$ is a transmission bandwidth at timing i, $P_{0\_PUSCH}(i)$ is target reception power at timing I when the propagation loss is assumed to be "0", α is a weighting factor of a fractional TPC, PL is a measurement value of the propagation loss, $\Delta_{TF}(i)$ is an offset at timing i dependent on MCS (Modulation and Coding Scheme), and f(i) is a correction value at timing i by the above-mentioned transmission power control information (TPC) or extended transmission power control information (Extended TPC).

The transmission power control section 1411 increases or decreases the correction value f(i) at timing i in 4 levels as shown in FIG. 20A, when the transmission power control information (TPC) included in the UL scheduling grant is input from the scheduling grant demodulation/decoding section 1400. Meanwhile, the transmission power control section 1411 increases or decreases the correction value f(i) at timing i in 16 levels as shown in FIG. 20B, when the extended transmission power control information (Extended TPC) included in the Aperiodic SRS grant is input from the scheduling grant demodulation/decoding section 1400.

The transmission signal with transmission power controlled in the transmission power control section 1411 is input to the transmission/reception section 13 of FIG. 13, and is transmitted to the base station apparatus 20 via the amplifying section 12 and transmission/reception antenna 11.

Thus, in the mobile station apparatus 10 according to the modification, when transmission of the data channel signal (PUSCH) is suspended and then resumed, the mobile station apparatus 10 is capable of suitably setting transmission power of the data channel signal (PUSCH) after a lapse of predetermined time, according to the extended transmission power control information (Extended TPC) included in the Aperiodic SRS grant transmitted from the base station apparatus 20. Similarly, the mobile station apparatus 10 is capable of suitably setting transmission timing of the data channel signal (PUSCH) after a lapse of predetermined time, according to the transmission timing control information (TA) included in the Aperiodic SRS grant transmitted from the base station apparatus 20.

Figure 23:
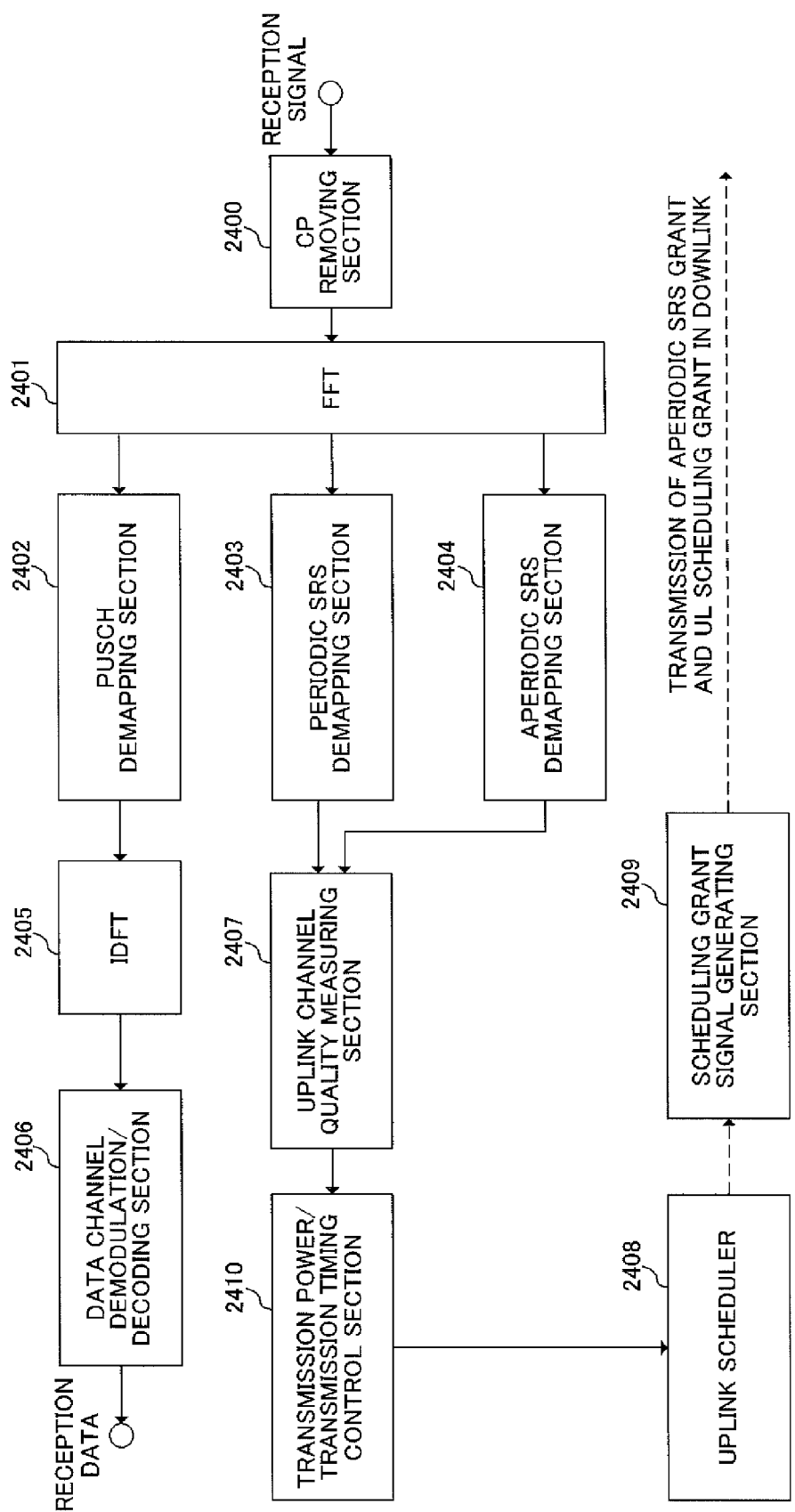
FIG. 23 is a functional block diagram of a baseband signal processing section that a base station apparatus according to the modification of the invention has.

FIG. 23 is a functional block diagram of the baseband signal processing section 24 that the base station apparatus 20 has. In addition, for convenience in description, in the baseband signal processing section 24 as shown in FIG. 23, the configuration related to the reference signal transmission method according to the eleventh aspect of the invention is only shown, but it is assumed that the section 24 is provided with the configuration provided in a normal baseband processing section.

A CP removing section 2400 removes a cyclic prefix from a reception signal input from the baseband signal processing section 24 of FIG. 14 to output to a Fast Fourier Transform (FFT) section 2401.

The FFT section 2401 performs fast Fourier transform processing on the reception signal input from the CP removing section 2400. Among the reception signals in the frequency domain transformed from the time domain, the FFT section 2401 outputs the reception signal concerning the PUSCH to a PUSCH demapping section 2402, outputs the reception signal concerning the Periodic SRS to a Periodic SRS demapping section 2403, and outputs the reception signal concerning the Aperiodic SRS to an Aperiodic SRS demapping section 2404.

The PUSCH demapping section 2402 demaps the reception signal concerning the PUSCH input from the FFT section 2401 in the frequency domain. The PUSCH demapping section 2402 outputs the demapped reception signal to an Inverse Discrete Fourier Transform (IDFT) section 2405.

The IDFT section 2405 performs inverse discrete Fourier transform processing on the reception signal input from the PUSCH demapping section 2402. The IDFT section 2405 outputs the reception signal in the time domain transformed from the frequency domain to a data channel demodulation/decoding section 2406.

The data channel demodulation/decoding section 2406 performs demodulation processing and decoding processing on the reception signal input from the IDFT section 2405 based on the transmission format (modulation scheme, coding rate). The reception data is reproduced by the demodulation processing and the decoding processing.

The Periodic SRS demapping section 2403 demaps the reception signal concerning the Periodic SRS input from the FFT section 2401 in the frequency domain. The Periodic SRS demapping section 2403 outputs the demapped reception signal to an uplink channel quality measuring section 2407.

The Aperiodic SRS demapping section 2404 demaps the reception signal concerning the Aperiodic SRS input from the FFT section 2401 in the frequency domain. The Aperiodic SRS demapping section 2404 outputs the demapped reception signal to the uplink channel quality measuring section 2407.

The uplink channel quality measuring section 2407 measures the uplink channel quality, based on the reception signal concerning the Periodic SRS or the reception signal concerning the Aperiodic SRS. The uplink channel quality measuring section 2407 outputs the measured uplink channel quality to a transmission power/transmission timing control section 2410.

The transmission power/transmission timing control section 2410 generates the transmission power control information (TPC), extended transmission power control information (Extended TPC), and transmission timing control information (TA), based on the uplink channel quality input from the uplink channel quality measuring section 2407. The transmission power control information (TPC) is to control transmission power of the uplink data channel signal (PUSCH) in 4 levels based on the uplink channel quality. Meanwhile, the extended transmission power control information (Extended TPC) is to control transmission power of the Aperiodic SRS and uplink data channel signal (PUSCH) in an extended control range (for example, 16 levels) wider than in the transmission power control information (TPC), based on the uplink channel quality, and is generated when a transmission trigger of the Aperiodic SRS grant is detected. As the transmission trigger of the Aperiodic SRS grant, for example, there is an event in which a scheduling grant signal generating section 2409 receives a scheduling request from the mobile station apparatus 10 after a lapse of predetermined time since the last scheduling request (i.e. the mobile station apparatus 10 resumes suspended transmission of the data channel signal (PUSCH)). Further, the transmission timing control information (TA) is to control transmission timing of the uplink data channel signal (PUSCH) based on the uplink channel quality, and is generated when the transmission trigger of the Aperiodic SRS grant is detected. In addition, the transmission power/transmission timing control section 2410 constitutes the transmission power control section and the transmission timing control section.

An uplink scheduler 2408 performs scheduling for the mobile station apparatus 10 to transmit a PUSCH, based on the uplink channel quality measured in the uplink channel quality measuring section 2407. The uplink scheduler 2408 outputs scheduling information determined by the scheduling, and the transmission power control information (TPC), extended transmission power control information (Extended TPC), and transmission timing control information (TA) determined in the transmission power/transmission timing control section 2410 to the scheduling grant signal generating section 2409.

The scheduling grant signal generating section 2409 constitutes the generation section, and based on the scheduling information input from the uplink scheduler 2408, generates a scheduling grant. More specifically, the scheduling grant signal generating section 2409 generates an UL scheduling grant as shown in FIG. 19A, in response to a scheduling request from the mobile station apparatus 10. Meanwhile, the scheduling grant signal generating section 2409 generates an Aperiodic SRS grant as shown in FIG. 19B, when the transmission trigger of the Aperiodic SRS grant as described above is detected. The UL scheduling grant signal or Aperiodic SRS grant signal generated in the scheduling grant signal generating section 2409 is transmitted to the mobile station apparatus 10 in downlink via the transmission/reception section 23, amplifying section 22 and transmission/reception antenna 21. In addition, the transmission/reception section 23, amplifying section 22 and transmission/reception antenna 21 constitute the transmission section.

Thus, the base station apparatus 20 according to the modification is capable of measuring the uplink channel quality based on the Periodic SRS that is periodically transmitted from the mobile station apparatus 10, even for a period during which there is no data channel signal (PUSCH) transmitted from the mobile station apparatus 10. Accordingly, the base station apparatus 20 is capable of setting the extended transmission power control information (Extended TPC), or the transmission timing control information (TA), while reflecting the channel state nearer timing at which the mobile station apparatus 10 resumes transmission of the data channel signal (PUSCH). Further, the base station apparatus 20 is capable of setting the extended transmission power control information (Extended TPC) with the increased control range of transmission power, and therefore, also when the mobile station apparatus 10 resumes suspended transmission of the data channel signal (PUSCH) (i.e. also when the uplink channel state significantly differs from that in last transmission of the data channel signal (PUSCH)), is capable of suitably setting transmission power of the data channel signal (PUSCH) in a wider control range.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2010-030372 filed on Feb. 15, 2010, Japanese Patent Application No. 2010-087380 filed on Apr. 5, 2010, Japanese Patent Application No. 2010-105940 filed on Apr. 30, 2010, and Japanese Patent Application No. 2010-141019 filed on Jun. 21, 2010 entire contents of which are expressly incorporated by reference herein.

The invention claimed is:

1. A reference signal transmission method comprising:
    transmitting an uplink scheduling grant including an instruction for transmission of a Sounding Reference Signal (SRS), from a base station apparatus; and
    transmitting the SRS from a mobile station apparatus, in response to the instruction for transmission of the SRS included in the uplink scheduling grant,
    wherein the mobile station apparatus transmits the SRS, in a subframe of the Physical Uplink Shared Channel (PUSCH) which the uplink scheduling grant instructs to transmit or in a first SRS-transmittable subframe among later subframes by a predetermined number of subframes after the subframe of the PUSCH.

2. The reference signal transmission method according to claim 1, wherein the base station apparatus notifies the mobile station apparatus of resource information to multiplex the SRS, using both the uplink scheduling grant and higher layer signaling.

3. The reference signal transmission method according to claim 1, wherein when the base station apparatus notifies, using the uplink scheduling grant, the mobile station apparatus of a part of resource information to multiplex SRSs from a plurality of mobile station apparatuses including the mobile station apparatus into a same symbol, the part of resource information is notified using another control bit constituting the uplink scheduling grant.

4. The reference signal transmission method according to claim 1, wherein the mobile station apparatus transmits the SRS in a subframe immediately before the subframe of the PUSCH that the uplink scheduling grant instructs to transmit.

5. The reference signal transmission method according to claim 1, wherein the mobile station apparatus transmits the SRS in a previous subframe by the predetermined number of subframes before the subframe of the PUSCH that the uplink scheduling grant instructs to transmit.

6. A mobile station apparatus comprising:
    a reception section configured to receive an uplink scheduling grant including an instruction for transmission of a Sounding Reference Signal (SRS) from a base station apparatus;
    a transmission section configured to transmit the SRS in a subframe of a Physical Uplink Shared Channel (PUSCH) that the uplink scheduling grant instructs to transmit or in a first SRS-transmittable subframe among later subframes by a predetermined number of subframes after the subframe of the PUSCH.

7. The mobile station apparatus according to claim 6, wherein the SRS is multiplexed into a last symbol in the subframe of the PUSCH that the uplink scheduling grant instructs to transmit.

8. The mobile station apparatus according to claim 6, wherein the SRS is multiplexed into a last symbol in a subframe immediately before the subframe of the PUSCH that the uplink scheduling grant instructs to transmit.

9. A base station apparatus comprising:
- a transmission section configured to transmit an uplink scheduling grant including an instruction for transmission of a Sounding Reference Signal (SRS) to a mobile station apparatus; and
- a reception section configured to receive the SRS transmitted from the mobile station apparatus in response to the instruction for transmission,
- wherein the SRS is transmitted from the mobile station apparatus in a subframe of a Physical Uplink Shared Channel (PUSCH) that the uplink scheduling grant instructs to transmit or in a first SRS-transmittable subframe among later subframes by a predetermined number of subframes after the subframe of the PUSCH.

10. The base station apparatus according to claim 9, wherein the transmission section is configured to transmit resource information to multiplex the SRS to the mobile station apparatus, using both the uplink scheduling grant and higher layer signaling.

11. A radio communication system comprising:
- a base station apparatus having:
    - a transmission section configured to transmit an uplink scheduling grant including an instruction for transmission of a Sounding Reference Signal (SRS); and
    - a reception section configured to receive the SRS transmitted from a mobile station apparatus in response to the instruction for transmission; and
- the mobile station apparatus having:
    - a reception section configured to receive the uplink scheduling grant from the base station apparatus; and
    - a transmission section configured to transmit the SRS in a subframe of a Physical Uplink Shared Channel (PUSCH) that the uplink scheduling grant instructs to transmit or in a first SRS-transmittable subframe among later subframes by a predetermined number of subframes after the subframe of the PUSCH.

\* \* \* \* \*